(12) United States Patent
Ma et al.

(10) Patent No.: US 10,848,079 B2
(45) Date of Patent: Nov. 24, 2020

(54) AMBIENT ENERGY HARVESTING DEVICE WITH CHARGE-CARRYING MOVABLE ELECTRODE

(71) Applicant: University of Hawaii, Honolulu, HI (US)

(72) Inventors: Tianwei Ma, Honolulu, HI (US); Jian Yu, Honolulu, HI (US); Enze Ma, Durham, NC (US)

(73) Assignee: UNIVERSITY OF HAWAII, Honolulu, HI (US)

( * ) Notice: Subject to any disclaimer, the term of this patent is extended or adjusted under 35 U.S.C. 154(b) by 4 days.

(21) Appl. No.: 16/346,679

(22) PCT Filed: Nov. 29, 2017

(86) PCT No.: PCT/US2017/063726
§ 371 (c)(1),
(2) Date: May 1, 2019

(87) PCT Pub. No.: WO2018/102421
PCT Pub. Date: Jun. 7, 2018

(65) Prior Publication Data
US 2019/0280621 A1  Sep. 12, 2019

Related U.S. Application Data

(60) Provisional application No. 62/427,764, filed on Nov. 29, 2016.

(51) Int. Cl.
*H02N 1/08* (2006.01)
(52) U.S. Cl.
CPC ..................... *H02N 1/08* (2013.01)
(58) Field of Classification Search
CPC .................................. H02N 1/00–12
(Continued)

(56) References Cited

U.S. PATENT DOCUMENTS

2008/0048521 A1  2/2008  Mabuchi et al.
2010/0295415 A1* 11/2010  Despesse .................. H02N 1/08
  310/300

(Continued)

FOREIGN PATENT DOCUMENTS

JP  2012023839 A  2/2012
JP  2013172605 A  9/2013

(Continued)

OTHER PUBLICATIONS

Achilli, A. et al., "Power generation with pressure retarded osmosis: An experimental and theoretical investigation", Journal of Membrane Science, Nov. 2009 (available online Jul. 2009), vol. 343, No. 1-2, pp. 42-52 <DOI:10.1016/j.memsci.2009.07.006>.

(Continued)

*Primary Examiner* — Thomas Truong
(74) *Attorney, Agent, or Firm* — Withrow & Terranova, P.L.L.C.

(57) ABSTRACT

Systems, apparatuses and methods for harvesting ambient energy involve an electrically conductive charge-carrying movable electrode. An apparatus includes an electrically conductive charge-carrying electrode, a first dielectric interface region, a second dielectric interface region, and at least one reference electrode. The first and second dielectric interface regions differ in surface charge density. In certain aspects, the movable electrode moves proximate and relative to the first and second dielectric interface regions in response to receipt of ambient energy, thereby providing first and second capacitances. The first capacitance differs from the second capacitance, and/or the first surface charge density differs from the second surface charge density. Movement of the movable electrode in combination with the differing capacitances and/or charge densities results in (Continued)

energy accumulation, thereby enabling ambient energy to be harvested efficiently and effectively.

21 Claims, 21 Drawing Sheets

(58) Field of Classification Search
USPC .................................................. 310/300, 309
See application file for complete search history.

(56) References Cited

U.S. PATENT DOCUMENTS

| | | | |
|---|---|---|---|
| 2010/0301699 | A1 | 12/2010 | Zhang |
| 2012/0274134 | A1 | 11/2012 | Gasparini et al. |
| 2013/0229087 | A1 | 9/2013 | Hayashi et al. |
| 2015/0077071 | A1 | 3/2015 | Fleming |
| 2015/0123513 | A1* | 5/2015 | Kim .................... H02N 1/08 310/300 |
| 2016/0040648 | A1 | 5/2016 | Wang et al. |
| 2018/0316280 | A1 | 11/2018 | Niu et al. |
| 2019/0280620 | A1 | 9/2019 | Ma et al. |

FOREIGN PATENT DOCUMENTS

| | | |
|---|---|---|
| JP | 2015039258 A | 2/2015 |
| KR | 1020160057912 A | 5/2015 |
| WO | 2015071345 A1 | 5/2015 |
| WO | 2018094256 A1 | 5/2018 |

OTHER PUBLICATIONS

AGC, "Amorphous Fluoropolymer", AGC Chemicals: Chemistry for a Blue Planet, Jul. 2015, 19 pages.
Amin, M. et al., "Advanced Faraday cage measurements of charge and open-circuit voltage using water dielectrics", Journal of Electrostatics, Jul. 2006, vol. 64, No. 7-9, pp. 424-430 <DOI:10.1016/j.elstat.2005.10.020>.
Arnold, D., "Review of microscale magnetic power generation", IEEE Transactions in Magnetics, Nov. 2007 (date of publication: Oct. 2007), vol. 43, No. 11, pp. 3940-3951 <DOI:10.1109/TMAG.2007.906150>.
Baytekin, H. et al., "The Mosaic of Surface Charge in Contact Electrification", Science, Jul. 2011, vol. 333, No. 6040, pp. 308-312 <DOI:10.1126/science.1201512>.
Beeby, S. et al., "A micro electromagnetic generator for vibration energy harvesting", Journal of Micromechanics and Microengineering, Jun. 2007, vol. 17, No. 7, pp. 12577-1265 <DOI:10.1088/0960-1317/17/7/007>.
Beeby, S. et al., "Energy harvesting vibration sources for microsystems applications", Measurement Science and Technology, Oct. 2006, vol. 17, pp. R175-R195 <DOI:10.1088/0957-0233/17/12/R01>.
Bell, L., "Cooling, Heating, Generating Power, and Recovering Waste Heat with Thermoelectric Systems", Science, Sep. 2008, vol. 321, No. 5895, pp. 1457-1461 <DOI:10.1126/science.1158899>.
Boisseau, S. et al., "Electrostatic Conversion for Vibration Energy Harvesting", Small-Scale Energy Harvesting, Oct. 2012, Ch. 5, pp. 91-134 <DOI:10.5772/51360>.
Bowen, C. et al., "Piezoelectric and ferroelectric materials and structures for energy harvesting applications", Energy & Environmental Science, Nov. 2013, vol. 7, No. 1, pp. 25-44 <DOI:10.1039/C3EE42454E>.
Brogioli, D., "Extracting Renewable Energy from a Salinity Difference Using a Capacitor", Physical Review Letters, Jul. 2009, vol. 103, article 058501, 4 pages <DOI:10.1103/PhysRevLett.103.058501>.
Brownjohn, J. et al., "Ambient vibration survey of the bosporus suspension bridge", Earthquake Engineering and Structural Dynamics, Feb. 1989, vol. 18, No. 2, pp. 263-283 <DOI:10.1002/eqe.4290180210>.

Calió, R. et al., "Piezoelectric Energy Harvesting Solutions", Sensors, Mar. 2014, vol. 14, No. 3, pp. 4755-4790 <DOI:10.3390/s140304755>.
Chae, J. et al., "Optimum thickness of hydrophobic layer for operating voltage reduction in EWOD systems", Sensors and Actuators A: Physical, Aug. 2014, vol. 215, pp. 8-16 <DOI:10.1016/j.sna.2013.11.001>.
Choi, D. et al., "A smart pipet tip: Triboelectricity and thermoelectricity assisted in situ evaluation of electrolyte concentration", Nano Energy, Aug. 2017 (available online Jun. 2017), vol. 38, pp. 419-427 <DOI:10.1016/j.nanoen.2017.06.020>.
Cognet, V. et al., "Bioinspired turbine blades offer new perspectives for wind energy", Proceedings of the Royal Society A, Feb. 2017, vol. 473, No. 2198, 13 pages <DOI:10.1098/rspa.2016.0726>.
Conway, B. et al., "The role and utilization of pseudocapacitance for energy storage by supercapacitors", Journal of Power Sources, May-Jun. 1997, vol. 66, No. 1-2, pp. 1-14 <DOI:10.1016/S0378-7753(96)02474-3>.
Conway, B., "Transition from 'Supercapacitor' to 'Battery' behavior in electrochemical energy storage", Journal of the Electrochemical Society, Jun. 1991, vol. 138, No. 6, pp. 1539-1548 <DOI:10.1149/1.2085829>.
Cuadras, A. et al., "Thermal energy harvesting through pyroelectricity", Sensors and Actuators A: Physical, Mar. 2010 (available online Jan. 2010), vol. 158, No. 1, pp. 132-139 <DOI:10.1016/j.sna.2009.12.018>.
Disalvo, F., "Thermoelectric Cooling and Power Generation", Science, Jul. 1999, vol. 285, No. 5428, pp. 703-706 <DOI:10.1126/science.285.5428.703>.
Donelan, J. et al., "Biomechanical Energy Harvesting: Generating Electricity During Walking with Minimal User Effort", Science, Feb. 2008, vol. 319, No. 5864, pp. 807-810 <DOI:10.1126/science.1149860>.
Erturk, A. et al., "An experimentally validated bimorph cantilever model for piezoelectric energy harvesting from base excitations", Smart Materials and Structures, Jan. 2009, vol. 18, No. 2, article 025009, 18 pages <DOI:10.1088/0964-1726/18/2/025009>.
Fahrenbruch, A. et al., "Fundamentals of solar cells: photovoltaic solar energy conversion", Elsevier (New York), 1983, Ch. 1, pp. 1-25.
Firestone, F., "A new analogy between mechanical and electrical systems", The Journal of the Acoustical Society of America, 1933 (published online Jun. 2005), vol. 4, pp. 248-267 <DOI:10.1121/1.1915605>.
Grätzel, M., "Photoelectrochemical cells", Nature, Nov. 2001, vol. 414, pp. 338-344 <DOI:10.1038/35104607>.
Guigon, R. et al., "Harvesting raindrop energy: experimental study", Smart Materials and Structures, Jan. 2008, vol. 17, article 015039, 6 pages <DOI:10.1088/0964-1726/17/01/015039>.
Guigon, R. et al., "Harvesting raindrop energy: theory", Smart Materials and Structures, Jan. 2008, vol. 17, article 015038, 8 pages <DOI:10.1088/0964-1726/17/01/015038>.
Halvorsen, E., "Fundamental issues in nonlinear widebandvibration energy harvesting", Physical Review E, 2013, vol. 87, article 042129, 6 pages <DOI:10.1103/PhysRevE.87.042129>.
Helseth, L. et al., "Contact Electrification and Energy Harvesting Using Periodically Contacted and Squeezed Water Droplets", Langmuir, Mar. 2015, vol. 31, No. 10, pp. 3269-3276 <DOI:10.1021/la503494c>.
Heremans, J., "Thermoelectricity: The ugly duckling", Nature, Apr. 2014, vol. 508, pp. 327-328 <DOI:10.1038/508327a>.
Horn, R. et al., "Contact Electrification and Adhesion Between Dissimilar Materials", Science, Apr. 1992, vol. 256, No. 5055, pp. 362-364 <DOI:10.1126/science.256.5055.362>.
Horn, R. et al. "Contact electrification induced by monolayer modification of a surface and relation to acid-base interactions", Nature, Dec. 1993, vol. 366, pp. 442-443 <DOI:10.1038/366442a0>.
Hunter, R. et al., "Foundations of Colloid Science", Clarendon Press, Feb. 1987, Ch. 6, pp. 316-391.
Hwang, G-T. et al., "Self-Powered Cardiac Pacemaker Enabled by Flexible Single Crystalline PMN-PT Piezoelectric Energy Har-

(56) References Cited

OTHER PUBLICATIONS vester", Advanced Materials, Apr. 2014, vol. 26, No. 28, pp. 4880-4887 <DOI:10.1002/adma.201400562>.

Jeon, S-B. et al., "3-Dimensional broadband energy harvester based on internal hydrodynamic oscillation with a package structure", Nano Energy, Oct. 2015, vol. 17, pp. 82-90 <DOI:10.1016/j.nanoen. 2015.08.002>.

Karami, M. et al., "Powering pacemakers from heartbeat vibrations using linear and nonlinear energy harvesters", Applied Physics Letters, Jan. 2012, vol. 100, article 042901, 5 pages <DOI:10.1063/ 1.3679102>.

Kilaru, M. et al., "Strong charge trapping and bistable electrowetting on nanocomposite fluoropolymer: BaTiO3 dielectrics", Applied Physics Letters, May 2007, vol. 90, article 212906, 4 pages <DOI:10. 1063/1.2743388>.

Klarman, D. et al., "A Model of Electrowetting, Reversed Electrowetting, and Contact Angle Saturation", Langmuir, Apr. 2011, vol. 27, No. 10, pp. 6031-6041 <DOI:10.1021/la2004326>.

Koka, A. et al., "Vertically aligned BaTiO3 nanowire arrays for energy harvesting", Energy & Environmental Science, 2014 (published online Oct. 2013), vol. 7, No. 1, pp. 288-296 <DOI:10.1039/ C3EE42540A>.

Krupenkin, T. et al., "Reverse electrowetting as a new approach to high-power energy harvesting", Nature Communications, Aug. 2011, vol. 2, No. 448, 8 pages <DOI:10.1038/ncomms1454>.

La Mantia, F. et al., "Batteries for Efficient Energy Extraction from a Water Salinity Difference", Nano Letters, Mar. 2011, vol. 11, No. 4, pp. 1810-1813 <DOI:10.1021/nl200500s>.

Lee, S. et al., "An electrochemical system for efficiently harvesting low-grade heat energy", Nature Communications, May 2014, vol. 5, No. 3942, 6 pages <DOI:10.1038/ncomms4942>.

Li, Q. et al., "Temperature Dependence of Electrical Properties and Crystal Structure of 0.29Pb(In1/2Nb1/2)O3-0.44Pb(Mg1/3Nb2/ 3)O3-0.27PbTiO3 Single Crystals", Advances in Condensed Matter Physics, Oct. 2013, vol. 2013, article 382140, 5 pages <DOI:10. 1155/2013/382140>.

Li, X. et al., "Hydroelectric generator from transparent flexible zinc oxide nanofilms", Nano Energy, Feb. 2017, vol. 32, pp. 125-129 <DOI:10.1016/j.nanoen.2016.11.050>.

Liliestam, J. et al., "Empirically observed learning rates for concentrating solar power and their responses to regime change", Nature Energy, Jun. 2017, vol. 2, No. 17094, 9 pages <DOI:10. 1038/nenergy.2017.94>.

Lin, J-H. et al., "Single—and few-layers MoS2 nanocomposite as piezo-catalyst in dark and self-powered active sensor", Nano Energy, Jan. 2017, vol. 31, pp. 575-581 <DOI:10.1016/j.nanoen.2016.12. 013>.

Lin, Z-H. et al., "Harvesting Water Drop Energy by a Sequential Contact-Electrification and Electrostatic-Induction Process", Advanced Materials, May 2014, vol. 26, No. 27, pp. 4690-4696 <DOI:10. 1002/adma.201400373>.

Lin, Z-H. et al., "Water—Solid Surface Contact Electrification and its Use for Harvesting Liquid-Wave Energy", Angewandte Chemie, Nov. 2013, vol. 52, No. 48, pp. 12545-12549 <DOI:10.1002/anie. 201307249>.

Lowell, J. et al., "Contact Electrification", Advances in Physics, 1980 (published online Jul. 2006), vol. 29, No. 6, pp. 947-1023 <DOI:10.1080/00018738000101466>.

Ma, T. et al., "Reaping the potentials of nonlinear energy harvesting with tunable damping and modulation of the forcing functions", Applied Physics Letters, May 2014, vol. 104, article 214104, 5 pages <DOI:10.1063/1.4879846>.

Ma, T-W. et al., "A novel parametrically excited non-linear energy harvester", Mechanical Systems and Signal Processing, Apr. 2012 (available online Feb. 2012), vol. 28, pp. 323-332 <DOI:10.1016/ j.ymssp.2012.01.017>.

Meninger, S. et al., "Vibration-to-electric energy conversion", IEEE Transactions on Very Large Scale Integration Systems, Feb. 2001, vol. 9, No. 1, pp. 64-76 <DOI:10.1109/92.920820>.

Moon, J. et al., "Electrical power generation by mechanically modulating electrical double layers", Nature Communications, Feb. 2013, vol. 4, article 1487, 6 pages <DOI:10.1038/ncomms2485>.

Nie, A. et al., "Twin boundary-assisted lithium ion transport", Nano Letters, 2015 (available online Dec. 2014), vol. 15, No. 1, pp. 610-615 <DOI:10.1021/nl504087z>.

Niu, S. et al., "Theoretical study of contact-mode triboelectric nanogenerators as an effective power source", Energy & Environmental Science, Sep. 2013, vol. 6, No. 12, pp. 3576-3583 <DOI:10. 1039/C3EE42571A>.

Norman, R., "Water Salination: A Source of Energy", Science, Oct. 1974, vol. 186, No. 4161, pp. 350-352 <DOI:10.1126/science.186. 4161.350>.

International Search Report and Written Opinion for International Patent Application No. PCT/US2017/063726, dated Mar. 12, 2018, 9 pages.

International Preliminary Report on Patentability for International Patent Application No. PCT/US2017/063726, dated Jun. 13, 2019, 6 pages.

Post, J. et al., "Salinity-gradient power: Evaluation of pressure-retarded osmosis and reverse electrodialysis", Journal of Membrane Science, Feb. 2007, vol. 288, No. 1-2, pp. 218-230 <DOI:10.1016/ j.memsci.2006.11.018>.

Radousky, H. et al., "Energy harvesting: an integrated view of materials, devices and applications", Nanotechnology, Nov. 2012, vol. 23, No. 50, article 502001, 35 pages <DOI:10.1088/0957-4484/ 23/50/502001>.

Rica, R. et al., "Capacitive Mixing for Harvesting the Free Energy of Solutions at Different Concentrations", Entropy, Apr. 2013, vol. 15, No. 4, pp. 1388-1407 <DOI:10.3390/e15041388>.

Rustomji, C. et al., "Liquefied gas electrolytes for electrochemical energy storage devices", Science, Jun. 2017, vol. 356, No. 6345, article eaal4263, 12 pages <DOI:10.1126/science.aal4263>.

Santos, L. et al., "Water with Excess Electric Charge", Journal of Physical Chemistry C, May 2011, vol. 115, No. 22, pp. 11226-11232 <DOI:10.1021/jp202652q>.

Sheberla, D. et al., "Conductive MOF electrodes for stable supercapacitors with high areal capacitance", Nature Materials, Feb. 2017 (published online Oct. 2016), vol. 16, pp. 220-224 <DOI:10.1038/ nmat4766>.

Sterken, T. et al., "A new power MEMS component with variable capacitance", Proceedings of Pan Pacific Microelectronics Symposium (Kohala, HI, Feb. 18-20, 2003), 2003, pp. 27-34.

Sterken, T. et al., "An electret-based electrostatic /spl mu/-generator", 12th International Conference on Solid-State Sensors, Actuators and Microsystems. Digest of Technical Papers. (Boston, MA, Jun. 8-12, 2003), 2003 (date added to IEEE Xplore: Aug. 2003), 1291-1294 <DOI:10.1109/SENSOR.2003.1217009>.

Stokes, L. et al., "Renewable energy policy design and framing influence public support in the United States", Nature Energy, Jun. 2017, vol. 2, No. 17107, 6 pages <DOI:10.1038/nenergy.2017. 107>.

Stootsman, J. et al., "New and Old Concepts in Thermoelectric Materials", Angewandte Chemie, Nov. 2009 (available online Oct. 2009), vol. 48, No. 46, pp. 8618-8639 <DOI:10.1002/anie. 200900598>.

Swarnkar, A. et al., "Quantum dot-induced phase stabilization of α-CsPbI3 perovskite for high-efficiency photovoltaics", Science, Oct. 2016, vol. 354, No. 6308, pp. 92-95 <DOI:10.1126/science. aag2700>.

Uihlein, A. et al., "Wave and tidal current energy—A review of the current state of research beyond technology", Renewable and Sustainable Energy Reviews, May 2016, vol. 58, pp. 1070-1081 <DOI:10. 1016/j.rser.2015.12.284>.

Varpula, A. et al., "Harvesting Vibrational Energy Using Material Work Functions", Scientific Reports, Oct. 2014, vol. 4, No. 6799, 9 pages <DOI:10.1038/srep06799>.

Verheijen, H. et al., "Reversible Electrowetting and Trapping of Charge: Model and Experiments", Langmuir, Sep. 1999, vol. 15, No. 20, pp. 6616-6620 <DOI:10.1021/la990548n>.

Wang, Z. et al., "Piezoelectric Nanogenerators Based on Zinc Oxide Nanowire Arrays", Science, Apr. 2006, vol. 312, No. 5771, pp. 242-246 <DOI:10.1126/science.1124005>.

(56) References Cited

OTHER PUBLICATIONS

Wang, Z. et al., "Progress in triboelectric nanogenerators as a new energy technology and self-powered sensors", Energy & Environmental Science, Jun. 2015, vol. 8, No. 8, pp. 2250-2282 <DOI:10.1039/C5EE01532D>.

Wang, Z. et al., "Triboelectric Nanogenerators as New Energy Technology for Self-Powered Systems and as Active Mechanical and Chemical Sensors", ACS Nano, Sep. 2013, vol. 7, No. 11, pp. 9533-9557 <DOI:10.1021/nn404614z>.

White, B., "Energy-Harvesting Devices: Beyond the Battery", Nature Nanotechnology, Feb. 2008, vol. 3, pp. 71-73 <DOI:101038/nnano.2008.19>.

Xue, G. et al., "Water-evaporation-induced electricity with nanostructured carbon materials", Nature Nanotechnology, Jan. 2017, vol. 12, pp. 317-321 <DOI:10.1038/nnano.2016.300>.

Yang, Y. et al., "Charging-free electrochemical system for harvesting low-grade thermal energy", Proceedings of the National Academy of Sciences, Nov. 2014, vol. 111, No. 48, pp. 17011-17016 <DOI:10.1073/pnas.1415097111>.

Yatsuzuka, K. et al., "Electrification phenomena of pure water droplets dripping and sliding on a polymer surface", Journal of Electrostatics, Apr. 1994, vol. 32, No. 2, pp. 157-171 <DOI:10.1016/0304-3886(94)90005-1>.

Yin, J. et al., "Generating electricity by moving a droplet of ionic liquid along graphene", Nature Nanotechnology, Apr. 2014, vol. 9, pp. 378-383 <DOI:10.1038/nnano.2014.56>.

Yin, J. et al., "Waving potential in graphene", Nature Communications, May 2014, vol. 5, No. 3582, 6 pages <DOI:10.1038/ncomms4582>.

Yu, J. et al., "Exponential energy harvesting through repetitive reconfigurations of a system of capacitors", Communications Physics, Mar. 2018, vol. 1, No. 9, 10 pages <DOI:10.1038/s42005-018-0010-y>.

Yu, J. et al., "Harvesting energy from low-frequency excitations through alternate contacts between water and two dielectric materials", Scientific Reports, Dec. 2017, vol. 7, article 17145, 9 pages <DOI:10.1038/s41598-017-17522-8>.

Zhang, J. et al., "Superhydrophobic PTFE Surfaces by Extension", Macromolecular Rapid Communications, Jun. 2004 (first published May 2004), vol. 25, No. 11, pp. 1105-1108 <DOI:10.1002/marc.200400065>.

Zhu, G. et al., "Toward Large-Scale Energy Harvesting by a Nanoparticle-Enhanced Triboelectric Nanogenerator", Nano Letters, Jan. 2013, vol. 13, No. 2, pp. 847-853 <DOI:10.1021/nl4001053>.

Zuo, L. et al., "Energy Harvesting, Ride Comfort, and Road Handling of Regenerative Vehicle Suspensions", Journal of Vibration and Acoustics, Feb. 2013, vol. 135, No. 1, article 011002, 8 pages <DOI:10.1115/1.4007562>.

International Search Report and Written Opinion for International Patent Application No. PCT/US2017/062378, dated Mar. 12, 2018, 9 pages.

International Preliminary Report on Patentability for International Patent Application No. PCT/US2017/062378, dated May 31, 2019, 6 pages.

Notice of Allowance for U.S. Appl. No. 16/346,676, dated Aug. 6, 2020, 9 pages.

\* cited by examiner

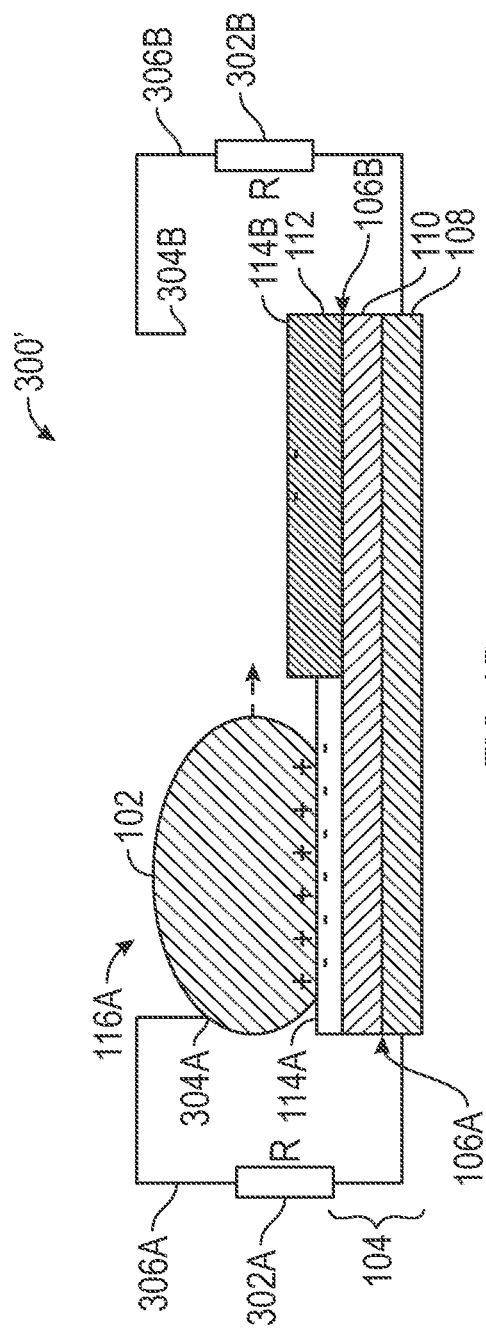
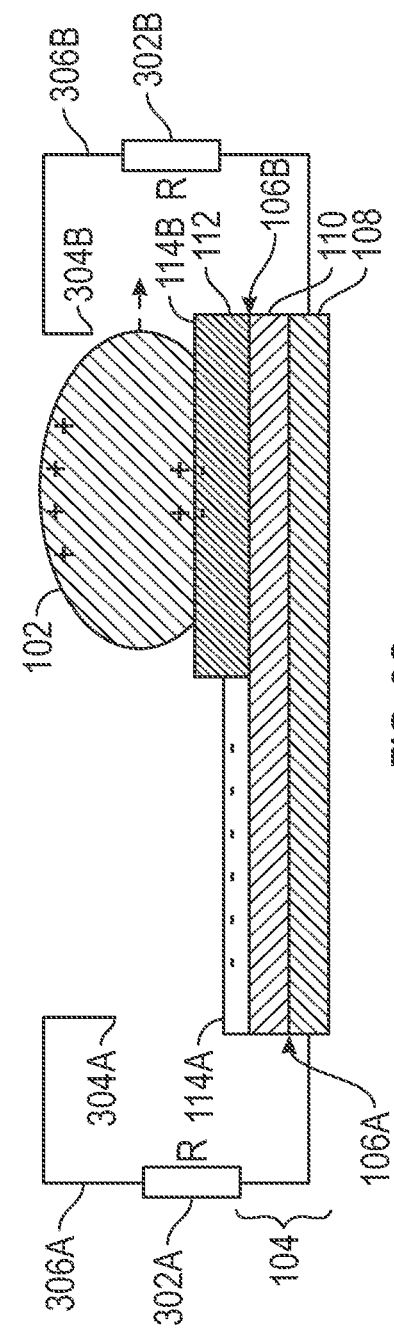
FIG. 3B
FIG. 3C

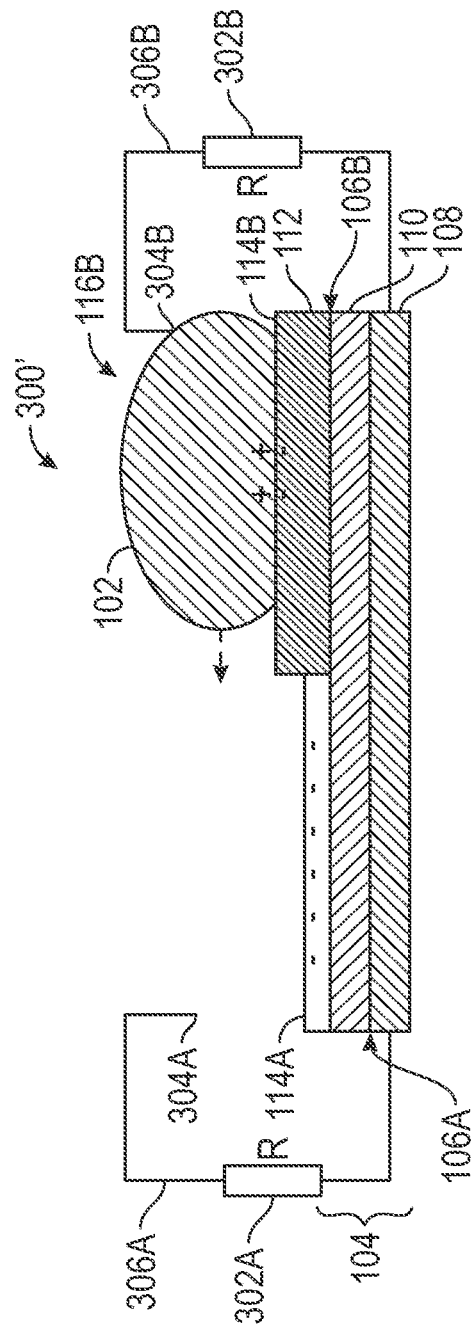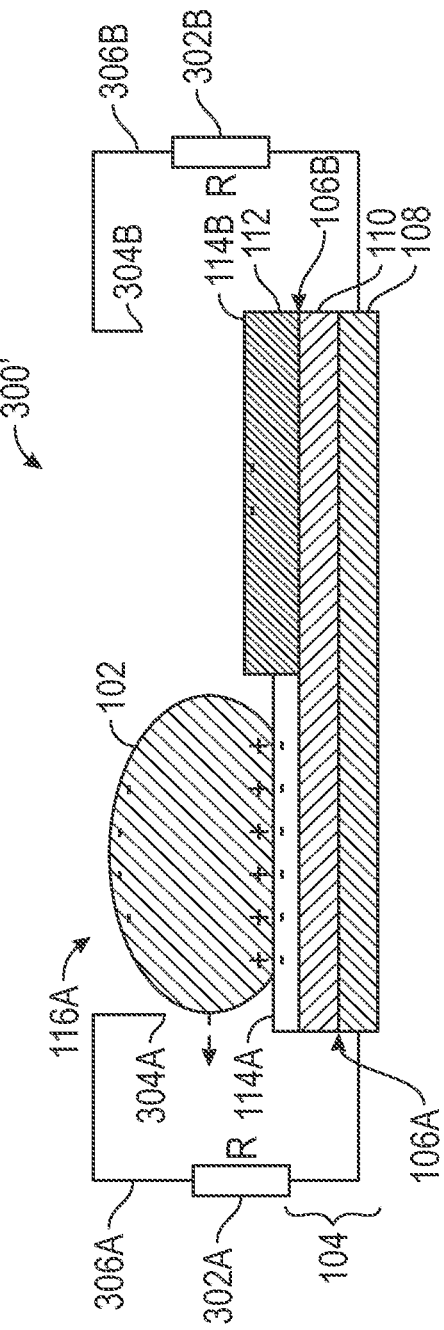

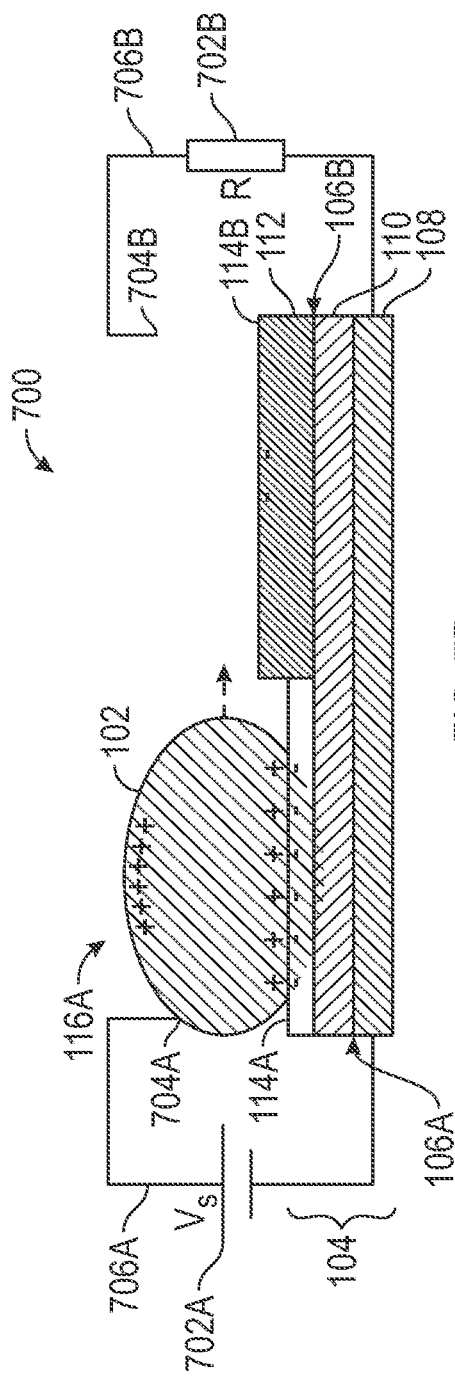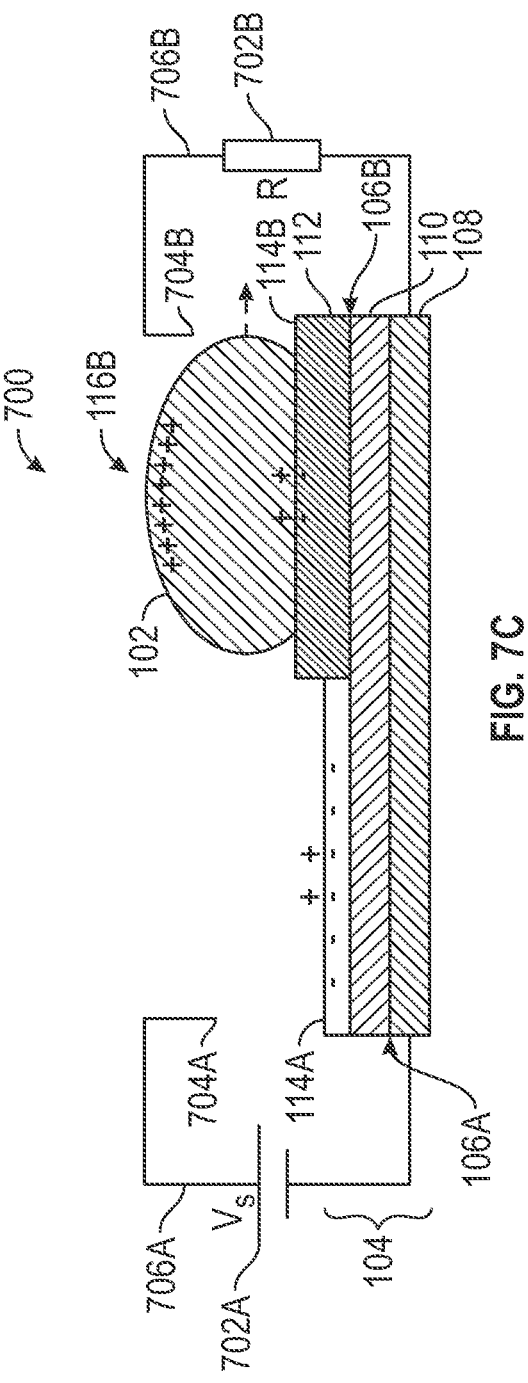
FIG. 7B
FIG. 7C

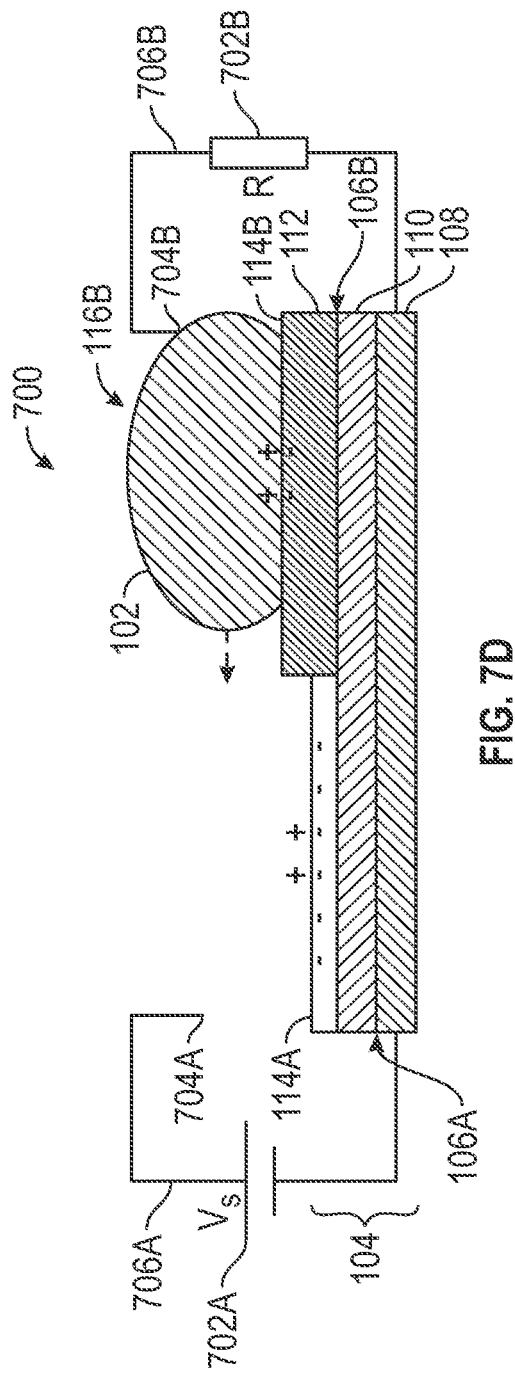
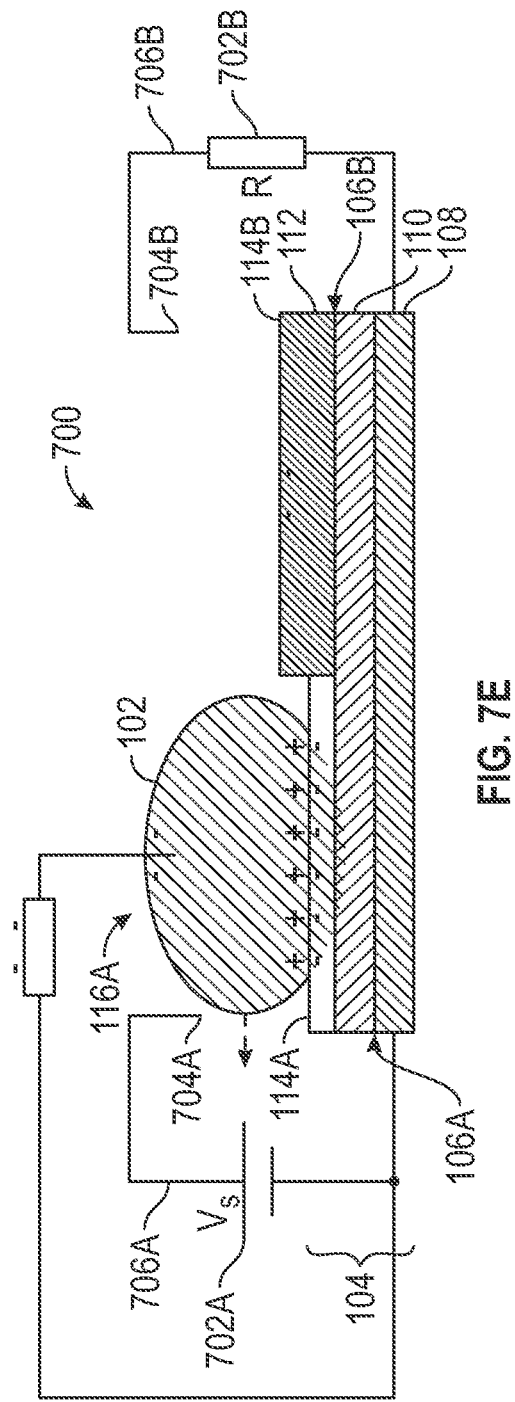

AMBIENT ENERGY HARVESTING DEVICE WITH CHARGE-CARRYING MOVABLE ELECTRODE

RELATED APPLICATIONS

This application is a 35 U.S.C. § 371 national phase filing of International Application No. PCT/US2017/063726 filed Nov. 29, 2017, and claims the benefit of U.S. Provisional Patent Application No. 62/427,764 filed Nov. 29, 2016, wherein the entire contents of the foregoing applications are hereby incorporated by reference herein.

GOVERNMENT RIGHTS IN THE INVENTION

This invention was made with government support under CMMI0758632 awarded by the National Science Foundation and under DOT-10-030 awarded by the U.S. Department of Transportation. The government has certain rights in the invention.

TECHNICAL FIELD

This disclosure relates to ambient energy harvesting. In particular, the present disclosure relates to systems, apparatuses, and methods for harvesting ambient energy with an electrically conductive charge-carrying movable electrode.

BACKGROUND

Advances in low-power electronics and distributed systems have stimulated significant interest in small-scale power supply systems that generate electricity from ambient environmental energy sources. There is a growing need for reliable in situ power generation in various applications. In particular, there has been increased interest in harvesting energy from the ambient environment, such as from harvesting electrostatic energy.

Some methods attempt to utilize electrostatically induced change in the distribution of charges to harvest external energy as electric current, such as through continuous control of the charge that is attracted to a liquid-solid interface. This control is achieved by manipulating the contact area at the interface through either deformations of a water droplet or separation of a droplet from a polymer. However, because the resulting electric current depends on the kinetic energy of the droplet, these techniques are generally limited to applications involving fast excitations. Furthermore, continuously changing the contact area requires either a precise, consistent control of the deformations of individual droplets or a source that continuously produces droplets for separation, but both are difficult to achieve in response to ambient vibration conditions.

Thus, current techniques are limited in that they cannot efficiently and effectively harvest low-level, ambient energy.

SUMMARY

Provided herein, by way of certain exemplary/illustrative embodiments, are systems, apparatuses, and methods for harvesting ambient energy by an electrically conductive charge-carrying movable electrode. In particular, the apparatus includes an electrically conductive charge-carrying electrode, a first dielectric interface region, a second dielectric interface region, and at least one reference electrode. The first and second dielectric interface regions differ in surface charge density. In certain aspects, the movable electrode moves proximate and relative to the first and second dielectric interface regions in response to receipt of ambient energy, thereby providing first and second capacitances. The first capacitance differs from the second capacitance, and/or the first surface charge density differs from the second surface charge density. Movement of the movable electrode in combination with the differing capacitances and/or charge densities results in energy accumulation, thereby enabling ambient energy to be harvested efficiently and effectively. In particular, in response to receipt of ambient energy, the movable electrode may be moved between (i) a first position proximate to the first dielectric interface region and (ii) a second position proximate to the second dielectric interface region. The movable electrode closes a first conductive path (and induces a first current) with the at least one reference electrode when in the first position, and closes a second conductive path (and induces a second current) with the at least one reference electrode when in the second position. An amplitude of the second current is dependent on a difference between the first capacitance and the second capacitance, and/or a difference between the first surface charge density and the second surface charge density.

In one aspect, an apparatus for harvesting ambient energy includes an electrically conductive charge-carrying movable electrode, a first dielectric interface region having a first surface charge density, a second dielectric interface region having a second surface charge density, and at least one reference electrode. The apparatus is configured for relative movement of the movable electrode in response to receipt of ambient energy between (i) a first position proximate to the first dielectric interface region, yielding a first state of the apparatus and (ii) a second position in which the movable electrode is proximate to the second dielectric interface region, yielding a second state of the apparatus. When the apparatus is in the first state, the movable electrode, the first dielectric interface region, and the at least one reference electrode provide a first capacitance, and when the apparatus is in the second state, the movable electrode, the second dielectric interface region, and the at least one reference electrode provide a second capacitance. The apparatus is configured such that the movable electrode closes a first conductive path with the at least one reference electrode when the apparatus is in the first state, and the movable electrode closes a second conductive path with the at least one reference electrode when the apparatus is in the second state. The apparatus includes at least one of the following features (a) or (b): (a) the first capacitance differs from the second capacitance, or (b) the first surface charge density differs from the second surface charge density.

In certain embodiments, the first capacitance differs from the second capacitance. In certain embodiments, the apparatus further includes an electrical charge source in the first conductive path. In certain embodiments, the first surface charge density differs from the second surface charge density. In certain embodiments, the first surface charge density differs from the second surface charge density, and the apparatus further includes an electrical charge source in the first conductive path. In certain embodiments, the first capacitance differs from the second capacitance, and the first surface charge density differs from the second surface charge density. In certain embodiments, the apparatus further includes an electrical charge source in the first conductive path.

In certain embodiments, the movable electrode comprises a liquid droplet. In certain embodiments, the liquid droplet comprises water or mercury.

In certain embodiments, the first dielectric interface region comprises a different thickness than the second dielectric interface region. In certain embodiments, the first dielectric interface region is compositionally different from the second dielectric interface region.

In certain embodiments, the apparatus is configured such that the movable electrode closes a third conductive path with the at least one reference electrode when the apparatus is in an intermediate state between the first state and the second state. In certain embodiments, the apparatus further comprises an electrical charge source in the first conductive path. In certain embodiments, the apparatus is configured such that a continuous conductive path is provided between the movable electrode and the at least one reference electrode when the apparatus is operated between the first state and the second state.

In certain embodiments, the at least one reference electrode comprises a common reference electrode. In certain embodiments, the at least one reference electrode comprises a first reference electrode associated with the first dielectric interface region, and a second reference electrode associated with the second dielectric interface region. In certain embodiments, the first dielectric interface region is arranged between the movable electrode and the at least one reference electrode, and the second dielectric interface region is arranged between the movable electrode and the at least one reference electrode.

In another aspect, a method for harvesting ambient energy utilizing an apparatus comprising an electrically conductive charge-carrying movable electrode, a first dielectric interface region having a first surface charge density, a second dielectric interface region having a second surface charge density, and at least one reference electrode is disclosed. The method includes effecting, in response to receipt of ambient energy, relative movement of the movable electrode between a first position proximate to the first dielectric interface region, yielding a first state of the apparatus and a second position proximate to the second dielectric interface region, yielding a second state of the apparatus. The method further includes closing, by the movable electrode, a first conductive path with the at least one reference electrode when the apparatus is in the first state, thereby inducing a first current in the first conductive path. The movable electrode, the first dielectric interface region, and the at least one reference electrode providing a first capacitance when the apparatus is in the first state. The method further includes closing, by the movable electrode, a second conductive path with the at least one reference electrode when the apparatus is in the second state, thereby inducing a second current in the second conductive path. The movable electrode, the second dielectric interface region, and the at least one reference electrode providing a second capacitance when the apparatus is in the second state. An amplitude of the second current is dependent on at least one of the following features (a) or (b): (a) a difference between the first capacitance and the second capacitance, or (b) a difference between the first surface charge density and the second surface charge density.

In certain embodiments, the amplitude of the second current is dependent on a difference between the first capacitance and the second capacitance. In certain embodiments, the amplitude of the second current is dependent on a difference between the first surface charge density and the second surface charge density. In certain embodiments, the amplitude of the second current is dependent on both (i) a difference between the first capacitance and the second capacitance, and (ii) a difference between the first surface charge density and the second surface charge density.

In further aspects of the disclosure, it is specifically contemplated that any two or more aspects, embodiments, or features disclosed herein may be combined for additional advantage.

Those skilled in the art will appreciate the scope of the present disclosure and realize additional aspects thereof after reading the following detailed description of certain exemplary/illustrative embodiments in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

FIG. 3B is a side cross-sectional view of an illustrative ambient energy harvesting system with discrete conductive paths and without a voltage bias, with the first dielectric interface region and the second dielectric interface region having differing thicknesses, and the apparatus being in a first operational phase with the movable electrode in a first position proximate to the first dielectric interface region and with a first conductive path closed;

FIG. 3C is a side cross-sectional view of the ambient energy harvesting system of FIG. 3B in a second operational phase with the movable electrode in a second position proximate to the second dielectric interface region with a second conductive path open;

FIG. 3D is a side cross-sectional view of the ambient energy harvesting system of FIG. 3B in a third operational phase with the movable electrode in a third position proximate to the second dielectric interface region with the second conductive path closed;

FIG. 3E is a side cross-sectional view of the ambient energy harvesting system of FIG. 3B in a fourth operational phase with the movable electrode in a fourth position proximate to the first dielectric interface region with the first conductive path open;

FIG. 6E is a plot of net charge versus droplet volume and contact area using an illustrative ambient energy harvesting apparatus with a movable electrode;

FIG. 7B is a side cross-sectional view of an illustrative ambient energy harvesting system with discrete conductive paths and with a voltage bias, the first dielectric interface region and the second dielectric interface region having differing thicknesses, the apparatus being in a first operational phase with the movable electrode in a first position proximate to the first dielectric interface region and with a first conductive path closed;

FIG. 7C is a side cross-sectional view of the ambient energy harvesting system of FIG. 7B in a second operational phase with the movable electrode in a second position proximate to the second dielectric interface region with a second conductive path open;

FIG. 7D is a side cross-sectional view of the ambient energy harvesting system of FIG. 7B in a third operational phase with the movable electrode in a third position proximate to the second dielectric interface region with the second conductive path closed;

FIG. 7E is a side cross-sectional view of the ambient energy harvesting system of FIG. 7B in a fourth operational phase with the movable electrode in a fourth position proximate to the first dielectric interface region with the first conductive path open;

DETAILED DESCRIPTION

Figure 1A:
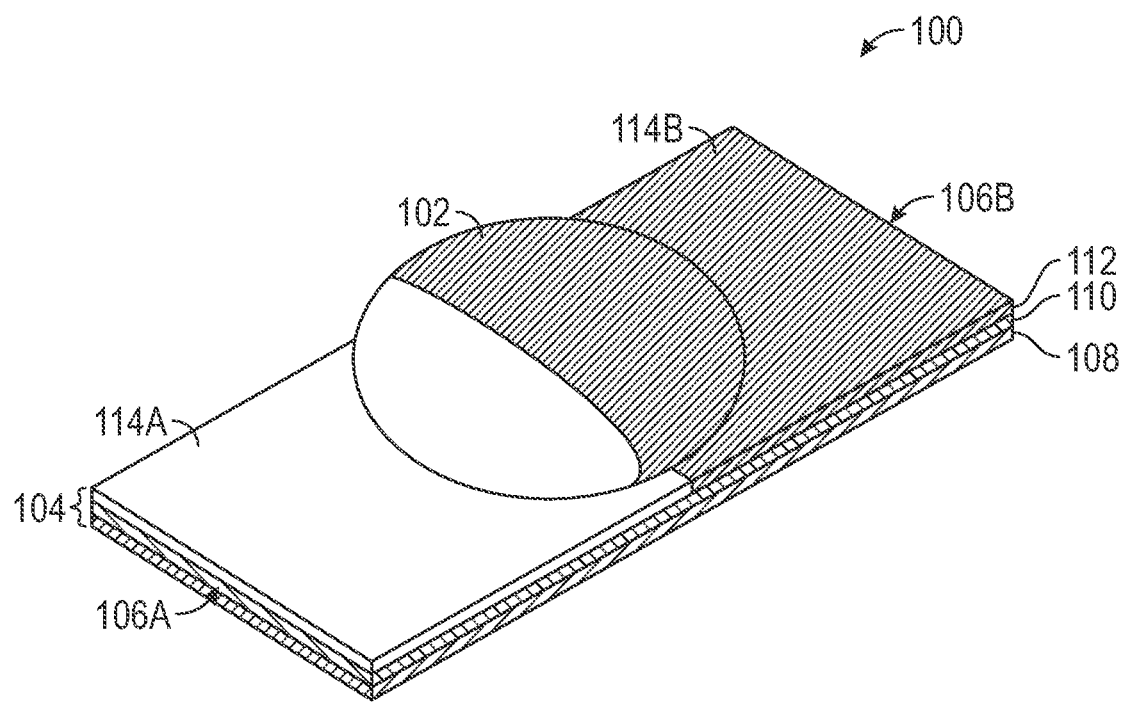
FIG. 1A is a perspective view of an ambient energy harvesting apparatus according to certain embodiments including an electrically conductive charge-carrying movable electrode, a first dielectric interface region having a first surface charge density, a second dielectric interface region having a second surface charge density, and at least one reference electrode.

The embodiments set forth below represent the necessary information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. It will also be understood that when an element is referred to as being "connected" to another element, it can be directly connected to the other element or intervening elements may be present.

Relative terms such as "above" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1B:
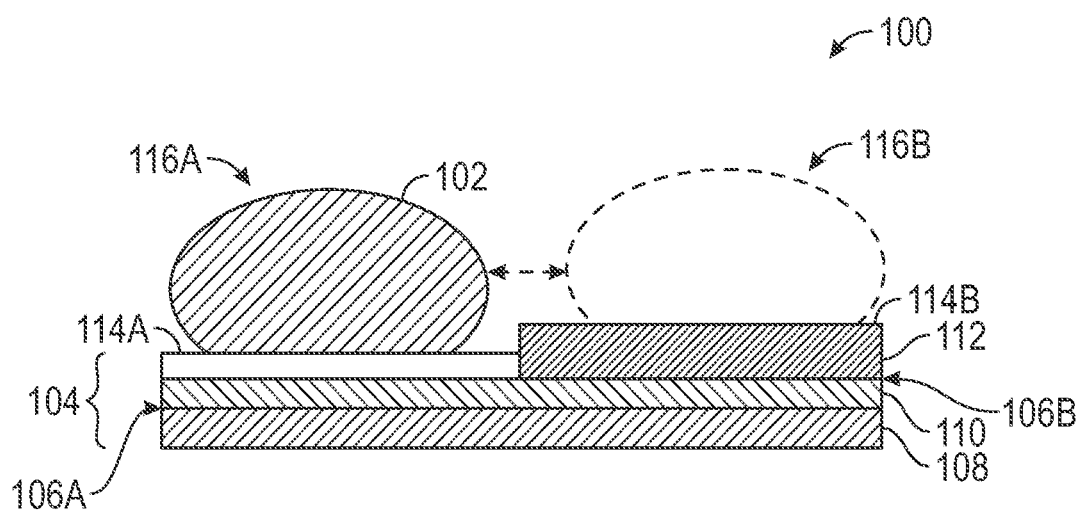
FIG. 1B is a side cross-sectional view of the ambient energy harvesting apparatus of FIG. 1A.

FIG. 1A and FIG. 1B illustrate an ambient energy harvesting apparatus 100 according to certain embodiments. In particular, FIG. 1A is a perspective view of an ambient energy harvesting apparatus 100, and FIG. 1B is a side cross-sectional view of the ambient energy harvesting apparatus 100 of FIG. 1A. The ambient energy harvesting apparatus 100 includes an electrically conductive charge-carrying movable electrode 102 (which may be referred to as a movable electrode) and a base 104 having a first side 106A and a second side 106B opposite the first side 106A. The movable electrode 102 is a liquid droplet (which may also be referred to as a liquid droplet, etc.), such as a water droplet or a mercury droplet. The movable electrode 102 is freestanding and is freely movable without inhibition. In other words, the motion of the movable electrode 102 is not governed by a stiffness factor, and there is no resonant frequency associated with the apparatus 100, such that the apparatus 100 performs equally well for vibrations at very different frequencies.

The base 104 includes a reference electrode 108 (which may also be referred to as a common reference electrode, reference electrode layer, electrode substrate, fixed electrode, etc.), where the reference electrode extends from the first side 106A to the second side 106B. The reference electrode 108 may include silicon, doped silicone, graphene, etc. However, it is noted that in some embodiments, the reference electrode 108 may comprise a plurality of reference electrodes. In particular, a first reference electrode may be positioned proximate to the first side 106A of the base 104 and the second reference electrode may be positioned proximate to an opposing second side 106B of the base 104. The base 104 further includes a middle dielectric layer 110 (which may also be referred to as a dielectric coating) positioned above the reference electrode 108. In certain embodiments, the dielectric layer 110 includes tantalum pentoxide ($Ta_2O_5$) (e.g., 300 nm thick). In certain embodiments, the dielectric layer is 200 nm layer of silicon dioxide grown on a base embodied in a doped silicon wafer.

The base 104 further includes a top nonpolar dielectric layer 112 (which may also be referred to as a nonpolar dielectric coating) positioned above the reference electrode 108 and the dielectric layer 110. The top nonpolar dielectric layer 112 includes a first dielectric interface region 114A positioned towards the first side 106A of the base 104 and a second dielectric interface region 114B positioned towards the second side 106B of the base 104. The first dielectric interface region 114A has a first surface charge density, and the second dielectric interface region 114B has a second surface charge density.

In certain embodiments, the first dielectric region 114A differs in thickness and/or surface charge density relative to the second dielectric region 114B, as explained in more detail below. A difference in thickness between the first and second dielectric regions 114A, 114B generates different capacitances between electrodes separated by these regions. In certain embodiments, the first dielectric interface region 114A is compositionally different than the second dielectric interface region 114B, thereby providing a different charge density. In certain embodiments, the first dielectric interface region 114A (which may also be referred to as the thin layer, thin coating, thin interface region, etc.) may be thinner than the second dielectric interface region 114B (which may also be referred to as the thick layer, thick coating, thick interface region, etc.). The thinner and thicker non-polar coating can be fabricated with the same or different materials depending on the desired of contact electrification. For example, in certain embodiments, the first dielectric interface region 114A comprises an amorphous fluoropolymer (e.g., CYTOP® poly[tetrafluoroethylene/perfluoro(butenyl vinyl ether)], commercially available from Asahi Glass Co., Tokyo, Japan) thin film and the second dielectric interface region 114B comprises a polytetrafluoroethylene (PTFE) thin film, where the first dielectric interface region 114A is thinner than the second dielectric interface region 114B. It is noted that in this and other embodiments described herein, any type of CYTOP® may be used, including those with an end functional group of a carboxylic acid (e.g., —COOH), amide (e.g., —CONH), or trifluoromethyl ($CF_3$). In certain embodiments, the first dielectric interface region 114A and the second dielectric interface region 114B have the same surface area and cover half the surface of the reference electrode 108 and/or dielectric layer 110 (such that the border of the first dielectric interface region 114A and the second dielectric interface region 114B is midway between the first side 106A and the second side 106B of the base 104). In certain embodiments, the dielectric layer 110 is optional, but in other embodiments, the oxide layer is necessary to prevent electric leakage (e.g., due to pinholes in hydrophobic coatings).

The apparatus 100 is configured for relative movement of the movable electrode 102 in response to receipt of ambient energy between (i) a first position 116A proximate to the first dielectric interface region 114A, yielding a first state of the apparatus 100 and (ii) a second position 116B in which the movable electrode 102 is proximate to the second dielectric interface region 114B, yielding a second state of the apparatus 100. When the ambient energy harvesting apparatus 100 is in the first state, the movable electrode 102, the first dielectric interface region 114A, and the at least one reference electrode 108 provide a first capacitance. When the apparatus 100 is in the second state, the movable electrode 102, the second dielectric interface region 114B, and the at least one reference electrode 108 provide a second capacitance. In other words, the movable electrode 102, nonpolar dielectric layer 112 with first and second dielectric interface regions 114A, 114B with different thicknesses establish a variable capacitor. Solid dielectric materials with high dielectric constants can be used to increase the capacitance of the apparatus 100 (compared to other technologies which use air or vacuum), thereby providing a much higher dielectric constant and thus higher capacitance, leading to higher power output. Unlike other technologies, the ambient energy harvesting apparatus 100 takes advantage of contact electrification to enhance the energy harvesting effectiveness.

As explained in more detail below, the ambient energy harvesting apparatus 100 is configured such that the movable electrode 102 closes a first conductive path with the at least one reference electrode 108 when the apparatus 100 is in the first state (the first dielectric region 114A arranged between the movable electrode 102 and the reference electrode 108). The apparatus 100 is configured such that the movable electrode 102 closes a second conductive path with the at least one reference electrode 108 when the apparatus 100 is in the second state (the second dielectric region 114B arranged between the movable electrode 102 and the reference electrode 108). Further, the reference electrode 108 is a common reference electrode because a portion of the reference electrode 108 is positioned beneath the first dielectric interface region 114A and the second dielectric interface region 114B. However, in other embodiments, a first reference electrode is positioned beneath (or is associated with) the first dielectric interface region 114A and a second reference electrode is positioned beneath (or is associated with) the second dielectric interface region 114B.

To enable harvesting of ambient energy, the first capacitance differs from the second capacitance, and/or the first surface charge density differs from the second surface charge density. In response to oscillatory excitation, the movable electrode 102 (e.g., liquid droplet) moves back and forth on the nonpolar dielectric layer 112 (e.g., a hydrophobic surface formed by the non-polar coating). The ambient energy harvesting apparatus 100 harvests ambient mechanical energy as electric potential energy through the movable electrode 102 (e.g., water droplet) making alternate contact with the first dielectric interface region 114A and the second dielectric interface region 114B. Electrostatic energy harvesting relies on the work done by external energy against electrostatic forces so that the work is converted to electric potential energy. It is, therefore, more efficient to directly harvest the electric potential energy at its peak than to harvest it through the kinetic energy.

In certain embodiments, the ambient energy harvesting apparatus 100 harvests electrostatic energy due to movement of the movable electrode 102 across the first dielectric interface region 114A and the second dielectric interface region 114B having different surface charge densities, which enables strong electrostatic induction leading to a high harvesting efficiency. The larger the difference in surface charge density, the more ambient energy is harvested. For example, repetitive contact between a liquid droplet (an embodiment of the movable electrode 102) and an uncharged polymer film (an embodiment of the top dielectric layer 112) electrifies the polymer film, turning it into an electret. If a conductive liquid droplet is placed on the polymer electret, electrostatic induction occurs and the charge in the electret will attract the opposite charge in the droplet to the interface, and will repel the similar charge away.

In certain embodiments, the first dielectric interface region 114A includes CYTOP® amorphous fluoropolymer thin film and the second dielectric interface region 114B includes PTFE thin film. CYTOP® amorphous fluoropolymer and PTFE have very different amounts of saturated, negative charge from contact electrification. In particular, in certain embodiments, CYTOP® amorphous fluoropolymer and PTFE have a $-8.9$ nC/cm$^2$ difference in surface charge density, which triggers strong electrostatic induction so that energy could be harvested efficiently as electric potential energy. Because CYTOP® amorphous fluoropolymer and PTFE respond to contact electrification very differently, a hydrophobic surface created with them will be electrified at different levels if brought into contact with water. As a result, when the water droplet (as an embodiment of the movable electrode 102) moves across the CYTOP® amorphous fluoropolymer surface and PTFE surface, a fixed amount of charge is induced without the need for physical changes to the contact area. Motion of water on a hydrophobic surface of a conductive or semiconductive material modifies the electric double layer at the interface, creating a strong electrostatic induction of the water droplet which can be utilized for energy harvesting. In other words, due to contact electrification, initial contacts between the water droplet and the electrically neutral surface will electrify the surface so that both PTFE and CYTOP® amorphous fluoropolymer are negatively charged. If multiple contacts are made, the charge will quickly saturate at very different values. The charge in PTFE and CYTOP® amorphous fluoropolymer will be quasi-permanent, making the two sections behave as electrets. Subsequent motions of the water droplet on the surface will not only help maintain the charge in the hydrophobic coatings, but also invoke electrostatic induction.

In certain embodiments, the first dielectric interface region 114A has thickness that differs from that of the second dielectric interface region 114B. Due to the varying thickness of the nonpolar dielectric layer 112, the capacitance changes when the movable electrode 102 moves from the first side 106A to the second side 106B, where the capacitance associated with the thinner side is larger. The difference in capacitance can be controlled by adjusting the thickness variation between the first dielectric interface region 114A and the second dielectric interface region 114B. As explained in more detail below, charge may exist and/or be applied to the movable electrode 102, such as from an externally applied voltage, or contact electrification between the droplet and the surface. When charges exist on the movable electrode 102 and the reference electrode 108, the voltage across the movable electrode 102 and the reference electrode 108 fluctuates as the movable electrode 102 moves back and forth due to the position-dependent capacitance. In this way, the first dielectric interface region 114A and the second dielectric interface region 114B may be integral and/or compositionally the same.

The ambient energy harvesting apparatus 100 relies on the work done by the external energy source against electrostatic forces between opposite charges. Therefore, the apparatus 100 behaves capacitively in nature and prefers more charges to be involved and a wider range of capacitance change. The use of different materials in creating a hydrophobic surface allows for a continuous electrostatic induction process, leading to an alternating current when the movable electrode 102 is driven across the surface continuously. The performance can be further improved if materials with larger difference in surface charge densities are used. For example, if the hydrophobic surface can be created with PTFE and a material that acquires positive charge through contact electrification, the amount of induced charge in a water droplet will greatly increase, resulting in much increased electric potential energy.

The ambient energy harvesting apparatus 100 is able to harvest ambient energy, such as from low-level, low-frequency mechanic vibrations (e.g., 0.1 Hz to 200 Hz, 1 Hz to 100 Hz, 2 Hz to 10 Hz, etc.). The apparatus 100 can be used in a variety of applications, such as self-powered sensors and biomedical implants, power modules of portable electronic devices, wearable electronics, etc. In certain embodiments, the ambient energy harvesting apparatus 100 may be used to harvest energy from motions of liquids (e.g., ranging from ocean waves to falling raindrops). As the ambient energy harvesting apparatus 100 works without an external electrical source, it can be used in self-powered wearable electronics, among other applications.

Figure 2:
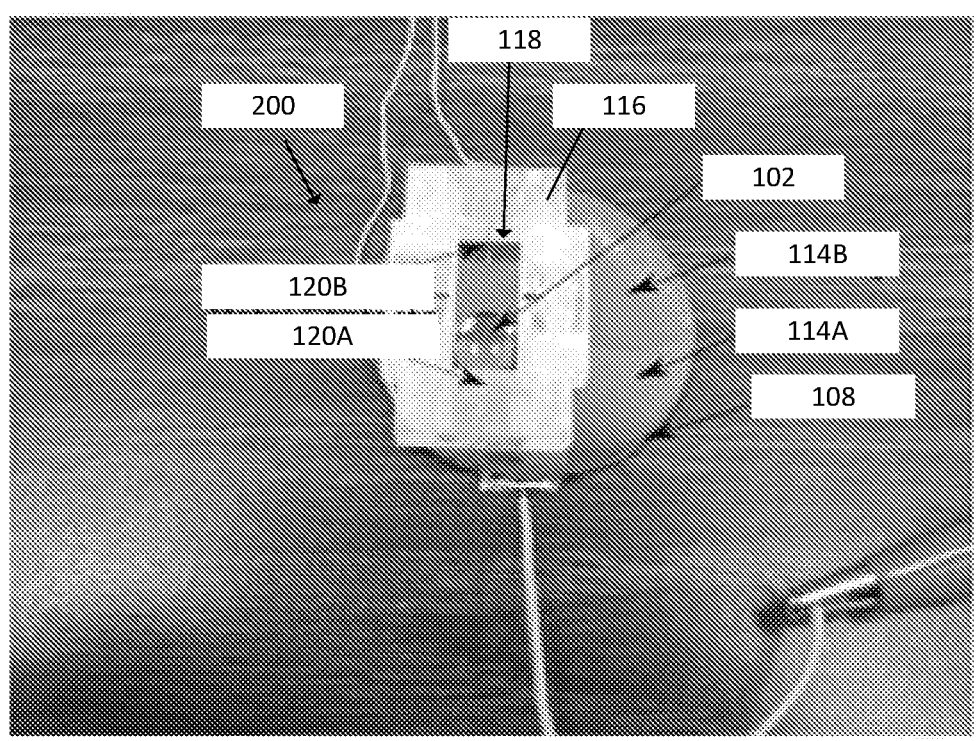
FIG. 2 is a top view photograph of an ambient energy harvesting apparatus according to certain embodiments.

FIG. 2 is a top view photograph of an ambient energy harvesting apparatus 200 according to another embodiment. The apparatus 200 includes the same features as those discussed above with FIGS. 1A-1B, except where otherwise noted. In particular, as discussed above, the apparatus 200 further includes a periphery layer 116 defining a central channel 118, a first contact 120A within the central channel 118 proximate to the first side 106A of the base 104, and a second contact 120B within the central channel 118 proximate to the second side 106B of the base 104. The movable electrode 102 (preferably embodied as a liquid droplet) is movable within the channel 118 to close a first conductive path when the movable electrode 102 contacts the first contact 120A and to close a second conductive path when the movable electrode 102 contacts the second contact 120B. In certain embodiments, the apparatus 100 may further include an enclosure layer (not shown) positioned over the periphery layer 116 and the channel 118, thereby enclosing the movable electrode 102 within the channel 118.

Switching in the apparatus 100 can be realized both passively and actively, thereby offering much more flexibility in the design of power management system for future commercial products. In particular, the movable electrode 102 (embodied as a water droplet) possesses a dual function as both an electrode and a passive switch, leading to the direct harvesting of the peak electric potential energy. This not only results in simple device architecture, but also allows for the use of schemes based on variable capacitors to improve its performance. Because potential energy depends only on the position and not the frequency of the motions of the water droplet, this approach is suitable for harvesting energy from low-level, low-frequency excitations.

Figure 3A:
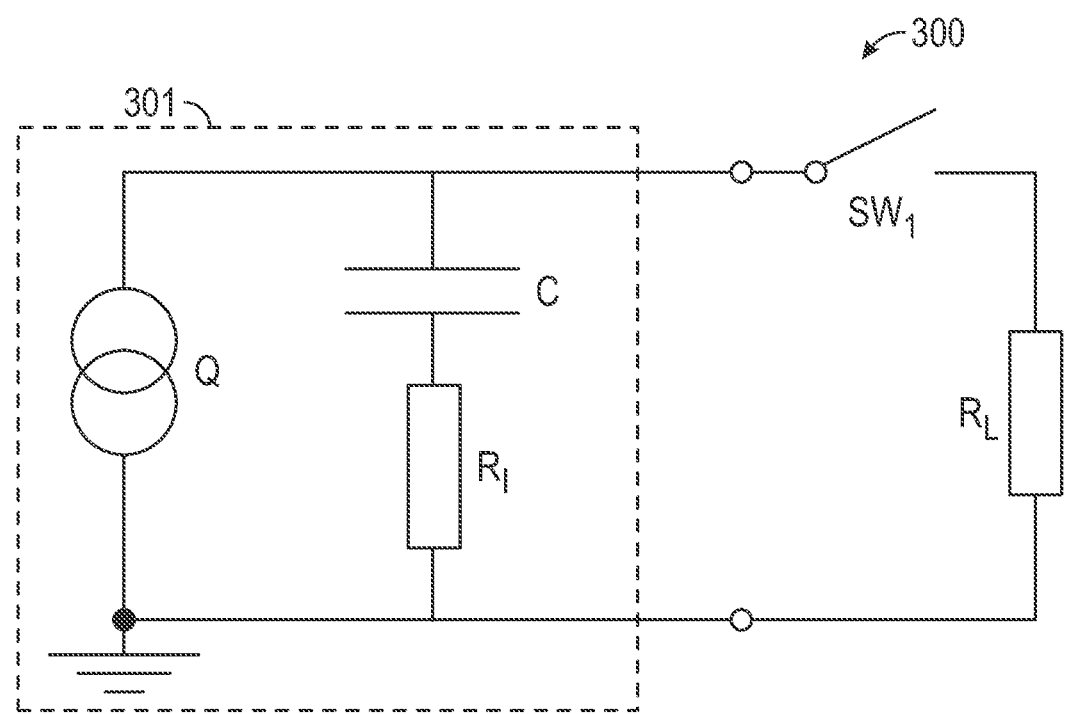
FIG. 3A is a circuit diagram of an ambient energy harvesting system with discrete conductive paths and without a voltage bias according to certain embodiments.

FIG. 3A is a circuit diagram of an ambient energy harvesting system 300 (see FIGS. 3B-3E) with discrete conductive paths and without a voltage bias (i.e., in a quasi-static operation without use of an external charge source). As explained in more detail below, an external charge source, although not necessary, can be used to enhance the energy harvesting performance. The ambient energy harvesting system 300 includes an electrostatic generator 301, a switch SW1, and a load $R_L$. The electrostatic generator 301 includes an induced charge Q, a capacitor C, and an energy loss $R_I$. For discussion purposes, the ambient energy harvesting system 300 includes a dielectric layer 110 (see FIGS. 1A-1B) of tantalum pentoxide, a first dielectric interface region 114A (see FIGS. 1A-1B) of CYTOP® amorphous fluoropolymer, a second dielectric interface region 114B (see FIGS. 1A-1B) of PTFE, and a movable electrode 102 (see FIGS. 1A-1B) of a liquid droplet. In particular, in certain embodiments the PTFE coating (thickness of 0.5 µm) is spin coated onto tantalum pentoxide. After the coated wafer is oven dried, a thick layer of CYTOP® amorphous fluoropolymer is applied to half of the PTFE coating to reach a total thickness of 8 µm. The wafer is then cured at 250° C. for one day. Acrylic sheets (e.g., 12 mm×25 mm) coated with a super-hydrophobic material are used as a periphery layer (which may also be referred to as side walls) to keep the water droplet within the desired area. Tungsten wire leads may be used as the metal contacts 120A, 120B (see FIG. 2) to avoid chemical reactions with water.

For simplicity, both the energy loss and the electrical load are assumed to be resistive, with resistances of $R_1$ and $R_L$, respectively. The charge transferred to the capacitor C is equal to the electrostatically induced charge Q on the liquid droplet, which can be estimated as:

$$Q = -Q_p = Q_c = \sigma_c A_c - \sigma_p A_p \tag{1}$$

where Q, σ and A represent the induced charge, the surface charge density, and the contact area, respectively. Subscripts p and c indicate the values for PTFE and CYTOP® amorphous fluoropolymer, respectively. Due to the similar contact angles of PTFE and CYTOP® amorphous fluoropolymer, the static contact areas were approximately the same, i.e. $A_p \approx A_c$. Because of the much higher relative permittivity of 25 for tantalum pentoxide as compared to 2.2 for CYTOP® amorphous fluoropolymer and 1.93 for PTFE, and its much lower thickness, the contribution of the $Ta_2O_5$ layer to the total capacitance between the water droplet and the substrate is negligible. Therefore, the capacitances can be calculated as $C_p = \varepsilon_0 \varepsilon_p A_p / d_p$ and $C_c = \varepsilon_0 \varepsilon_c A_c / d_c$, where $\varepsilon_0$ is vacuum permittivity, $\varepsilon_p$ and $\varepsilon_c$ are the relative permittivities of PTFE and CYTOP® amorphous fluoropolymer, respectively, $d_p$ and $d_c$ represent the thicknesses of the hydrophobic coatings. The total harvested energy in one cycle can be represented as $$E = \left( \frac{d_p}{2\varepsilon_0 \varepsilon_p A_p} + \frac{d_c}{2\varepsilon_0 \varepsilon_c A_c} \right) Q^2 \tag{2}$$

FIGS. 3B-3E are side cross-sectional views of an ambient energy harvesting system 300' with discrete conductive paths and without a voltage bias, illustrating operational phases of the system 300'. The first dielectric interface region 114A (see FIGS. 1A-1B) has a thickness that differs from that of the second dielectric interface region 114B (see FIGS. 1A-1B). Further, a first load 302A and first contact point 304A is positioned at a first side 106A (see FIGS. 1A-1B) of the base 104, and a second load 302B and second contact point 304B is positioned at a second side 106B of the base 104. In this way, the movable electrode 102 can only make contact with one load 302A, 302B at a time. However, it is noted that more or fewer loads 302A, 302B with more or fewer contact points (between the first and second contact points 304A, 304B) could be used (see FIG. 4).

FIG. 3B is a side cross-sectional view of the ambient energy harvesting system 300' in a first operational phase. The first operational phase includes the movable electrode 102 in a first position 116A proximate to the first dielectric interface region 114A and with a first conductive path 306A closed. Initially, the movable electrode 102 is on the first dielectric interface region 114A with SW1 in FIG. 3A being open. Because of contact electrification, an electrical double layer (DL) is formed with the amount of charges determined by the materials and surface characteristics of the movable electrode 102 and the first dielectric interface region 114A. SW1 of FIG. 3A then closes and current starts to flow through the load R until an equilibrium is reached. In other words, if an electrically neutral movable electrode 102 is placed on the charged first dielectric interface region (e.g., PTFE surface), the positive charge in the movable electrode 102 will be attracted to the interface to form an electric double layer, and the negative charge is repelled away from the interface, creating a negative potential relative to the reference electrode 108 (e.g., silicon substrate), which will create an electrical current through the metal contact. While CYTOP® amorphous fluoropolymer and PTFE generate similar water contact angles, and thus similar contact areas, the saturated surface charge density of CYTOP® amorphous fluoropolymer is significantly lower.

FIG. 3C is a side cross-sectional view of the ambient energy harvesting system 300' of FIG. 3B in a second operational phase with the movable electrode 102 in a second position 116B proximate to the second dielectric interface region 114B with a second conductive path 306B open. SW1 of FIG. 3A opens and the droplet moves to the thicker side. Because of the different electrical DL resulting from a weaker contact electrification effect, charges previously locked in the electrical DL are released, providing a net charge on the movable electrode 102. If the movable electrode 102 subsequently moves to the second dielectric interface region 114B (e.g., CYTOP® amorphous fluoropolymer surface), the electric double layer will change accordingly. Therefore, the potential of the droplet will become positive relative to the reference electrode 108 (e.g., silicon substrate).

FIG. 3D is a side cross-sectional view of the ambient energy harvesting system 300' of FIG. 3B in a third operational phase with the movable electrode 102 in a third position proximate to the second dielectric interface region 114B with the second conductive path 306B closed. SW1 of FIG. 3A closes to release the electrostatic energy to the load R.

FIG. 3E is a side cross-sectional view of the ambient energy harvesting system 300' of FIG. 3B in a fourth operational phase with the movable electrode 102 in a fourth position proximate to the first dielectric interface region 114A with the first conductive path 306A open. The movable electrode 102 moves back to the first dielectric interface region 114A. SW1 of FIG. 3A opens. Contact electrification reverts back to the first dielectric interface region 114A (having greater contact electrification than the second dielectric interface region 114B) and an opposite current can be generated if the droplet is connected to the external load. The subsequent motion of the droplet back to the first dielectric interface region 114A reestablishes the original electric double layer and creates a negative potential of the movable electrode 102.

An alternating current can be generated when the movable electrode 102 continuously moves across the surface of the top dielectric layer 112. Note that electrostatic induction will also take place in the reference electrode 108 due to the quasi-permanent surface charge. Therefore, the generated current theoretically includes the induced charge in the reference electrode 108. However, because the thickness of the double layer formed at the water-polymer interface is on the order of 10 nanometers (which is much smaller than the micrometer-scale distance between the reference electrode 108 and the surface charge), the electrostatic induction in the movable electrode 102 is the dominant mechanism. The potential energy of the induced charge on the movable electrode 102 can be modeled as the energy stored in an equivalent capacitor, with the movable electrode 102 and the reference electrode 108 as the electrodes. Therefore, the effect of electrostatic induction is equivalent to that of a charge source, which provides a fixed amount of charge to the equivalent capacitor.

Figure 4:
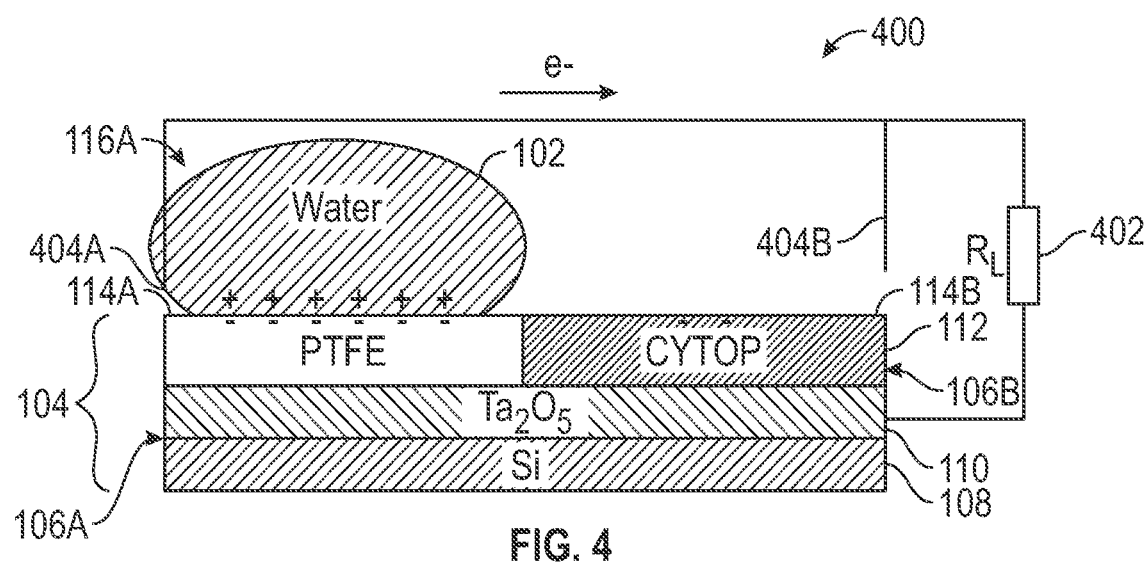
FIG. 4 is a side cross-sectional view of an illustrative ambient energy harvesting system with discrete conductive paths and without a voltage bias, the first dielectric interface region and the second dielectric interface region having the same thickness.

FIG. 4 is a side cross-sectional view of an ambient energy harvesting system 400 with discrete conductive paths and without a voltage bias, with the first dielectric interface region 114A (e.g., PTFE) and the second dielectric interface region 114B (e.g., CYTOP® amorphous fluoropolymer) having the same thickness. In particular, in certain embodiments, a TEFLON® AF 2400 amorphous fluoropolymer (a copolymer of perfluordimethyldioxol and tetrafluoroethylene, (commercially available from The Chemours Company, Wilmington, Del., USA) solution is first uniformly applied to one half of the dielectric layer 110 (e.g., tantalum pentoxide surface) that overlies a silicon wafer. The coated wafer is then oven dried at 200° C. for 1 hour. The process repeated several times until the desired thickness is obtained. The CYTOP® amorphous fluoropolymer solution is then applied to the other half of the dielectric layer 110 (e.g., tantalum pentoxide surface) in the same manner. The coated wafer is then cured at 250° C. for one day. In certain embodiments, the thicknesses are 6.6 μm and 10 μm for the PTFE and CYTOP® amorphous fluoropolymer coatings, respectively.

The ambient energy harvesting system 400 includes one electrical load 402. A first contact point 404A is positioned at a first side 106A of the base 104, and a second contact point 404B is positioned at a second side 106B of the base 104. In this way, the movable electrode 102 can only make contact with the load 402 at discrete points.

Figure 5:
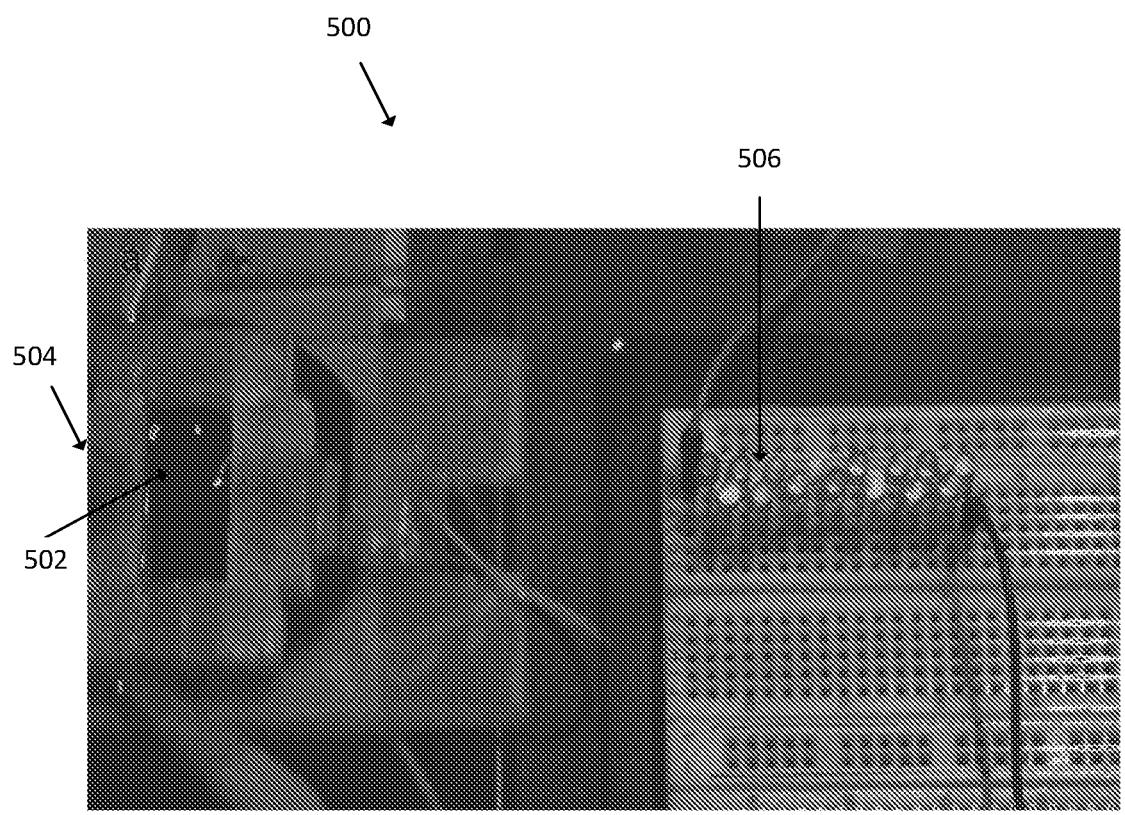
FIG. 5 is an upper perspective view photograph of an illustrative ambient energy harvesting system without a voltage bias.

FIG. 5 is an upper perspective view photograph of an ambient energy harvesting system 500 without a voltage bias. As illustrated, the energy harvested from a low-frequency vibration by a water droplet 502 of an ambient energy apparatus 504 illuminates 15 commercial LEDs 506 connected in series (with a zero bias) when subjected to a 2.5 Hz lateral vibration.

Figure 6A:
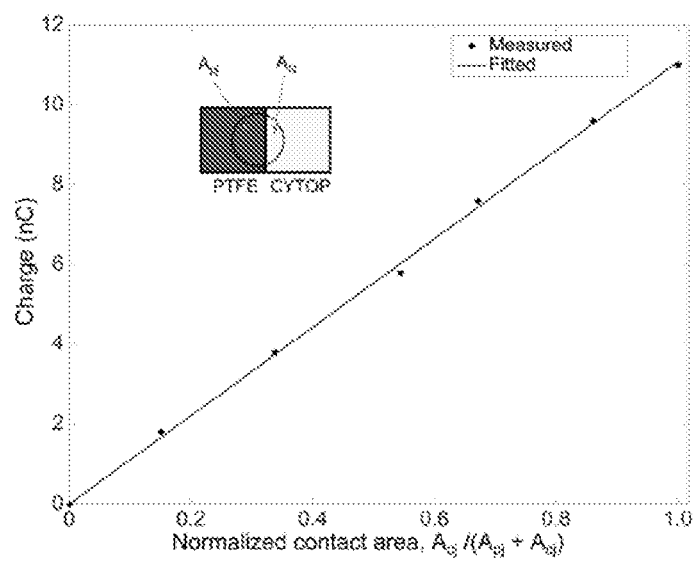
FIG. 6A is a plot of charge versus normalized contact area using an illustrative ambient energy harvesting apparatus with a movable electrode including a water droplet.

FIG. 6A is a plot of charge versus normalized contact area using an ambient energy harvesting apparatus with a movable electrode including a water droplet. The thicknesses of the PTFE and CYTOP® amorphous fluoropolymer were 6.6 μm and 10 μm, respectively. A tungsten contact was used at each side for the connection to the external circuit.

To produce the plot of FIG. 6A, multiple contacts were first made between water and the CYTOP® amorphous fluoropolymer and the PTFE surface to create a charged surface. A fresh water droplet was then deposited respectively onto the surfaces and the charge induced in the droplet was measured with an electrometer using the silicon substrate as the reference. PTFE and CYTOP® amorphous fluoropolymer acquired −10.7 nC/cm² and −1.8 nC/cm², respectively. A 400 µL water droplet was first placed on the PTFE surface with the induced charge zeroed by connecting a short circuit between the droplet and the silicon substrate. The droplet was then moved across the junction towards the CYTOP® amorphous fluoropolymer surface with the induced charge measured at different locations. This shows that the linear relationship is consistent with the model indicated by Eq. (1). In particular, the difference in surface charge densities of the two surfaces derived from the equation is calculated to be 9.4 nC/cm², which is consistent with the 8.9 nC/cm² obtained from direct measurements of the two surface charge densities.

Figure 6B:
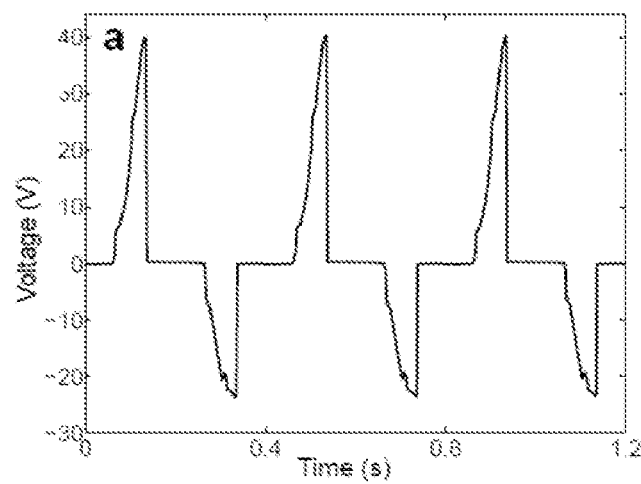
FIG. 6B is a plot of voltage versus time illustrating energy harvesting using an illustrative ambient energy harvesting apparatus with the movable electrode comprising a water droplet at 2.5 Hz excitation and an electric load connected via tungsten contacts.

FIG. 6B is a plot of voltage versus time illustrating energy harvesting using an ambient energy harvesting apparatus with the movable electrode comprising a water droplet at 2.5 Hz excitation and an electric load connected via tungsten contacts. To evaluate its effectiveness in harvesting energy from low-frequency vibrations, the apparatus 100 (see FIGS. 1A-1B) was first driven by a 2.5 Hz excitation, a frequency close to those of vibrations induced by human walking. A 400 µL water droplet and a resistor of 1 M Ohm were used. The contact areas were calculated to be $A_p \approx A_c \approx 1.14$ cm². The capacitances when the water droplet was on CYTOP® amorphous fluoropolymer and PTFE were measured statically to be 0.23 nF and 0.28 nF, respectively. FIG. 6B shows the voltages measured between the water droplet and the substrate. Power was delivered to the resistor whenever the water droplet moved across the surface, i.e. twice in a cycle. When the water droplet was driven from the PTFE to the CYTOP® amorphous fluoropolymer surface, the voltage increased from 0 V to 40 V immediately before the resistor was connected. When the droplet was driven back to the PTFE surface after releasing the positive potential to the resistor, the voltage changed from 0 V to −23.5 V. The asymmetry of the positive and negative peak values was due to the different capacitances associated with the two regions. Such difference in capacitance resulted from several factors associated with the two regions, including differences in thicknesses, dielectric constants, and dynamic contact areas, etc.

Figure 6C:
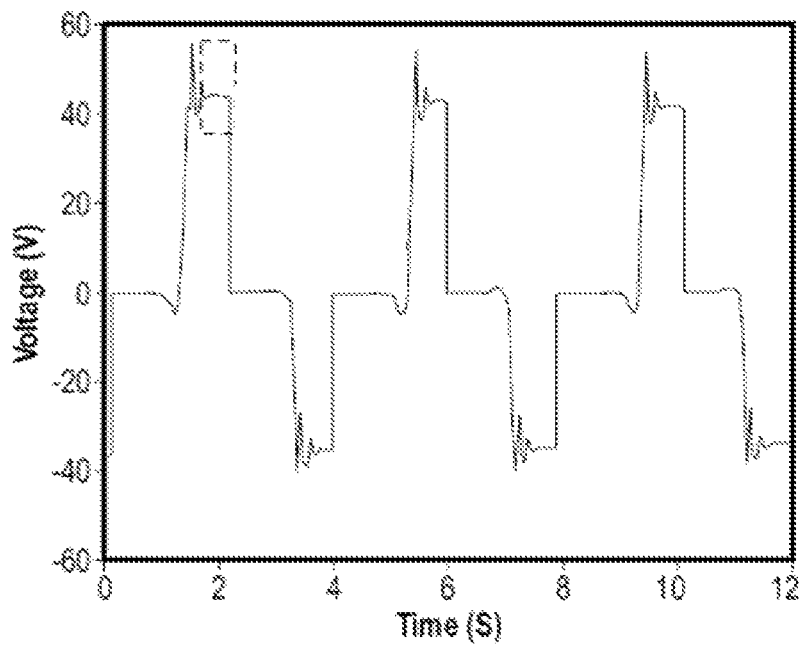
FIG. 6C is a plot of voltage versus time illustrating energy harvesting using an illustrative ambient energy harvesting apparatus with the movable electrode comprising a water droplet at 0.25 Hz excitation and an electric load connected via manual switches.
Figure 6D:
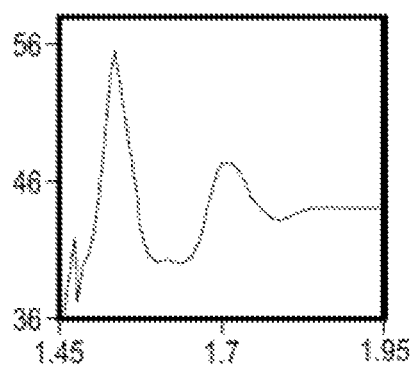
FIG. 6D is a magnified portion of the plot of FIG. 6B illustrating ripples due to damped vibrations of the water droplet colliding with walls within a channel of the energy harvesting apparatus.

FIG. 6C is a plot of voltage versus time illustrating energy harvesting using an ambient energy harvesting apparatus with the movable electrode comprising a water droplet subjected to 0.25 Hz lateral vibratory excitation and an electric load connected via manual switches. FIG. 6D is a magnified portion of the plot of FIG. 6C illustrating ripples due to damped vibrations of the water droplet colliding with walls within a channel of the energy harvesting apparatus.

In order to evaluate its performance under excitations of ultra-low driving frequencies, such as those of vibrations of large, flexible structures, the ambient energy harvesting apparatus was manually driven at a very low frequency, about 0.25 Hz. A manual switch was used to close the circuit so that the charge could be delivered to the load. When the water droplet moved from the PTFE to the CYTOP® amorphous fluoropolymer surface, the open-circuit voltage was about 42 V while the corresponding charge was measured to be 9.5 nC, which is consistent to the estimated value of 10.1 nC based on Eq. (1). The open-circuit voltage stayed at the same value when the water droplet was held in the same place. This confirms the capacitive behavior of the device. After the droplet was discharged, the water droplet was moved back to the PTFE surface. An open-circuit voltage of −34 V was then obtained. The corresponding charge was measured to be −9.5 nC. The difference in the capacitances associated with the CYTOP® amorphous fluoropolymer and the PTFE surfaces accounted for the different positive and negative peak voltages.

Figure 6E:
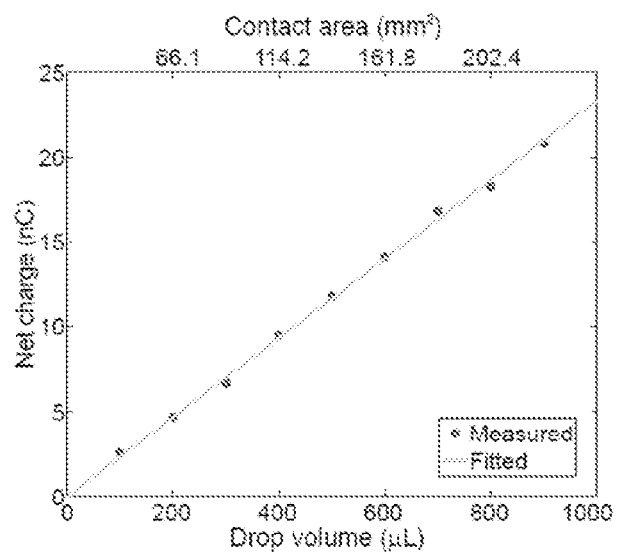
FIG. 6E is a plot of net charge versus droplet volume and contact area using an ambient energy harvesting apparatus with a movable electrode.
Figure 6F:
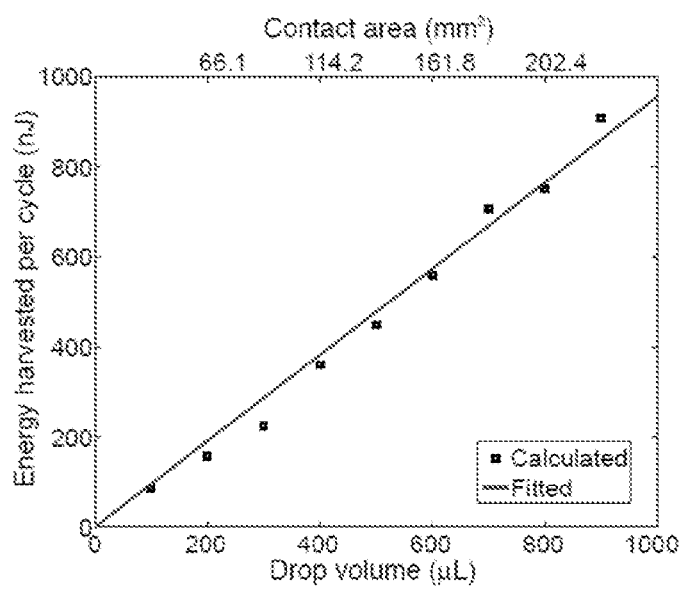
FIG. 6F is a plot of energy harvested per cycle versus droplet volume and contact area using an illustrative ambient energy harvesting apparatus with a movable electrode.

FIG. 6E is a plot illustrating net charge versus droplet volume and contact area using an ambient energy harvesting apparatus with a movable electrode. Because the contact area is proportional to the volume of the water droplet, a linear relationship exists between the amount of induced charge and the contact area. FIG. 6F is a plot illustrating energy harvested per cycle versus droplet volume and contact area using an ambient energy harvesting apparatus with a movable electrode. Using Eq. (2), one can estimate the energy harvested per cycle, as shown in FIG. 6F. The linear relationship indicates an energy density of 0.36 µJ/cm² per cycle.

It is worth noting that an 8° inclination is sufficient to drive a 400 µL water droplet to move across the two-region surface with a distance of 1.3 cm. The total mechanical potential energy available for harvesting is 7.1 µJ. As demonstrated in FIG. 6F, a harvesting efficiency of 2.5% may be achieved. The efficiency is independent of the load resistance and is two orders of magnitude higher than other technologies. In the experiments conducted, a water droplet of 400 µL alone could generate a peak open-circuit voltage of 42 V under a 0.25 Hz vibration. Under a 2.5 Hz vibration, the peak open-circuit voltage reached 115 V under an external bias of 8 V. The demonstrated efficiency is orders of magnitude higher than those of existing devices of similar dimensions.

Figure 7A:
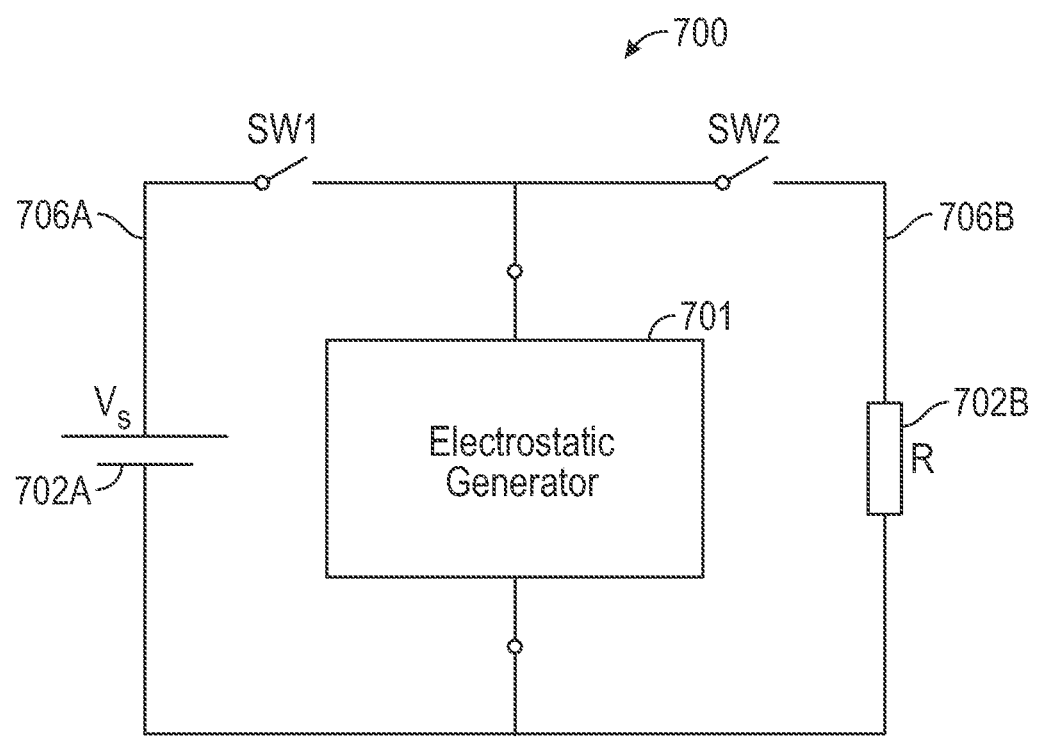
FIG. 7A is a circuit diagram of an illustrative ambient energy harvesting system with discrete conductive paths and with a voltage bias.

FIG. 7A is a circuit diagram of an ambient energy harvesting system 700 (see FIGS. 7B-7E) with discrete conductive paths and with a voltage bias (in a quasi-static operation with use of an external charge source). The ambient energy harvesting system 700 includes an electrostatic generator 701 similar to that discussed above with respect to FIG. 3A. As explained in more detail below, an external charge source (Vs), although not necessary, can be used to enhance the energy harvesting performance. In particular, the system 700 includes an electrical charge source in a first conductive path. Use of external voltage source is not necessary, but if different materials are used to form the hydrophobic surface, the contact electrification effect can be made stronger. In other words, an external source can be used to increase the energy output. As the total charges remain constant when the droplet moves from the thinner side to the thicker, electrical energy increases due to increased voltage. Switches SW1 and SW2 are used for the movable electrode 102 to connect and disconnect to the external source and load, respectively.

FIGS. 7B-7E are side cross-sectional views of an ambient energy harvesting system 700 with discrete conductive paths and without a voltage bias, illustrating operational phases of the ambient energy harvesting system. The first dielectric interface region 114A (e.g., PTFE) and the second dielectric interface region 114B (e.g., CYTOP® amorphous fluoropolymer) have differing thicknesses. Further, a charge source 702A and first contact point 704A is positioned at a first side 106A of the base 104, and a load 702B and second contact point 704B is positioned at a second side 106B of the base 104. In this way, the movable electrode 102 can only make contact with either the charge source 702A or the load 702B at a time. The performance of the ambient energy harvesting system 700 can be enhanced if the scheme based on variable capacitors is used with an external bias. In this case, the hydrophobic coatings can be fabricated with significantly different thicknesses. The resulting device essentially behaves as a variable capacitor. In certain embodiments, the PTFE and the CYTOP® amorphous fluoropolymer coatings were 0.5 µm and 8 µm, respectively, corresponding to measured capacitances of 3.99 nF and 0.26 nF, respectively.

FIG. 7B is a side cross-sectional view of an ambient energy harvesting system 700 with discrete conductive paths and with a voltage bias. The first operational phase includes the movable electrode 102 in a first position 116A proximate to the first dielectric interface region 114A and with a first conductive path 706A closed. The movable electrode 102 is on the thinner side of the coating with SW1 being closed and SW2 open (see FIG. 7A). Charges are applied to the device from the charge source 302A. A DL forms at the interface due to contact electrification.

When the droplet is at the designated location on the thinner side of the surface of the dielectric layer 112, SW1 closes and SW2 opens (see FIG. 7A). Charges from the external source to the capacitor according to the following relationship:

$$Q = CV \quad (1)$$

where Q denotes the amount of charges owing to the device, C denotes the capacitance associated with the thinner side, and V denotes the external voltage bias applied. The electrical energy stored in the device is:

$$E = \frac{1}{2}CV^2 = \frac{1}{2}\frac{Q^2}{C} \quad (2)$$

FIG. 7C is a side cross-sectional view of the ambient energy harvesting system of FIG. 7B in a second operational phase with the movable electrode 102 in a second position proximate to the second dielectric interface region 116B with a second conductive path 706B open. Because of the different electrical DL resulting from a weaker contact electrification effect, charges previously locked in the electrical DL are released, showing a net increase of unlocked charges on the movable electrode 102. When the movable electrode 102 moves to the CYTOP® amorphous fluoropolymer side, the electric potential of the movable electrode 102 relative to the substrate increases due to the reduced capacitance and the additional induced charge.

Switch SW1 then opens and the droplet moves to the thicker side, and Switch SW2 remains open (see FIG. 7A). The voltage across the capacitor increases to:

$$V' = \frac{Q}{C'} \quad (2)$$

where $C_0 < C$ is the capacitance associated with the thicker side. The electrical energy becomes:

$$E' = \frac{1}{2}\frac{Q^2}{C'} \quad (2)$$

The harvested energy, equal to the mechanical work done against the electrostatic force and stored in the electrostatic shield, is obtained as:

$$\Delta E = E' - E = \frac{1}{2}Q^2\left(\frac{1}{C'} - \frac{1}{C}\right) \quad (2)$$

FIG. 7D is a side cross-sectional view of the ambient energy harvesting system 700 of FIG. 7B in a third operational phase with the movable electrode 102 in a third position proximate to the second dielectric interface region 114B with the second conductive path 706B closed. SW1 remains open and SW2 closes (see FIG. 7A). The electrostatic energy is released to the load R. and SW2 opens. In other words, the electric potential energy increased accordingly, and such energy is delivered to the resistor upon closing of the circuit.

The energy can be transferred to the external load by closing SW2 (see FIG. 7A). Note that because of contact electrification, which plays the role of an external source, the device can work without the actual source. Two different non-polar materials can be used to enhance contact electrification.

FIG. 7E is a side cross-sectional view of the ambient energy harvesting system 700 of FIG. 7B in a fourth operational phase with the movable electrode 102 in a fourth position proximate to the first dielectric interface region 114A with the first conductive path 706A open. The movable electrode 102 moves back to the first dielectric interface region 114A, and contact electrification reverts back to the first dielectric interface region 114A (having greater contact electrification than the second dielectric interface region 114B). The charges with opposite sign are unlocked due to the stronger contact electrification. SW1 remains open and SW2 closes, the electrostatic energy is released to the load R, and then SW2 opens (see FIG. 7A).

When the movable electrode 102 moves from FIG. 7D to 7E, the total charge is $C_{pp} V_s - Q_p$. After the movable electrode 102 makes the connection with the metal contact on PTFE, the input energy can be expressed as below:

$$E_I = \frac{1}{2}C_p V_s^2 - \text{sign}\,(C_{pp}V_s - Q_p)\frac{(C_{pp}V_s - Q_p)^2}{2C_p} \quad (3)$$

where sign(x) is the signum function. When the water droplet is on PTFE, the capacitor is charged to $V_s$. While the droplet moves to the CYTOP® amorphous fluoropolymer surface, the energy delivered to the resistor can be expressed as:

$$E_O = \frac{(C_{pr}V_s + Q_p)^2}{2C_c} \quad (4)$$

Therefore, the harvested energy per cycle is:

$$E = E_O - E_I = \quad (5)$$
$$\frac{(C_{pr}V_s + Q_p)^2}{2C_c} + \text{sign}\,(C_{pp}V_s - Q_p)\frac{(C_{pp}V_s - Q_p)^2}{2C_p} - \frac{1}{2}C_p V_s^2$$

When the droplet moves back to the PTFE surface, the opposite charge is induced as in FIG. 7D and will be neutralized when the bias is applied again as in FIG. 7A. Thus, the measured voltages will always be positive.

Figure 8:
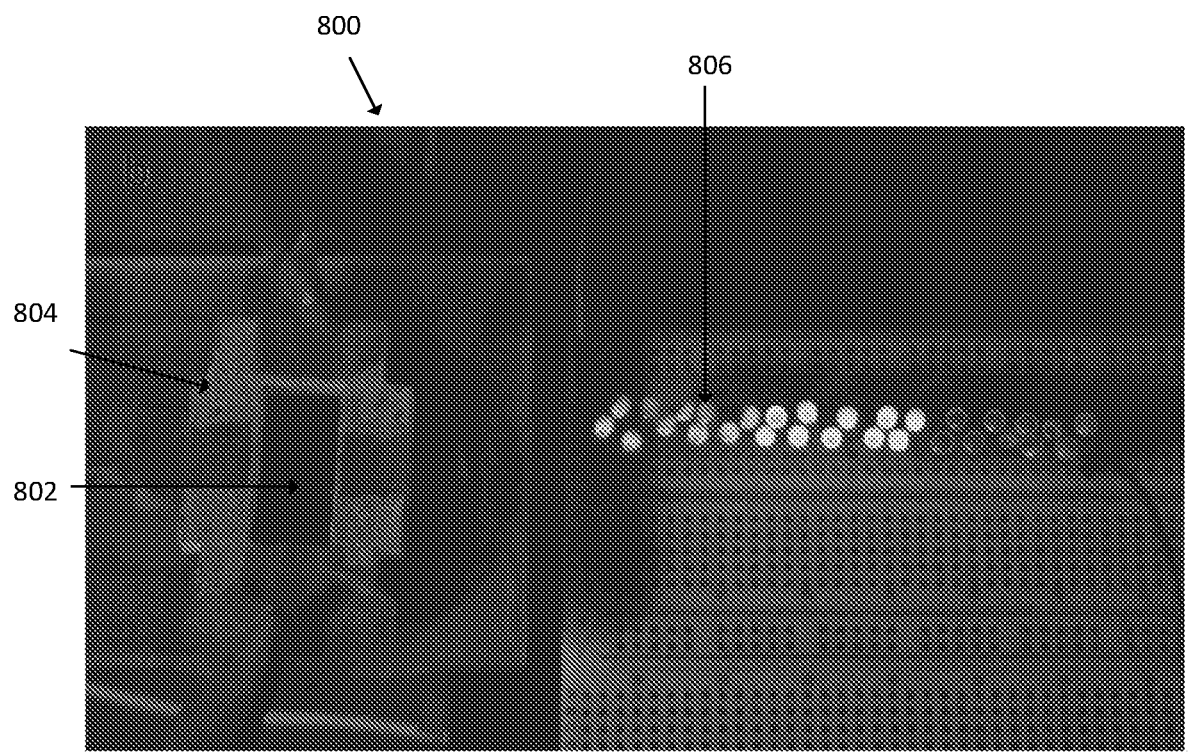
FIG. 8 is an upper perspective view photograph of an illustrative ambient energy harvesting system with a voltage bias.

FIG. 8 is an upper perspective view photograph of an ambient energy harvesting system 800 with a voltage bias. FIG. 8 demonstrates that the energy harvested from a low-frequency vibration by a water droplet 802 of the ambient energy harvesting apparatus 804 is sufficient to illuminate 30 commercial LEDs 806 (connected in series) under a 2.5 Hz vibration and an 8 V bias.

Figure 9A:
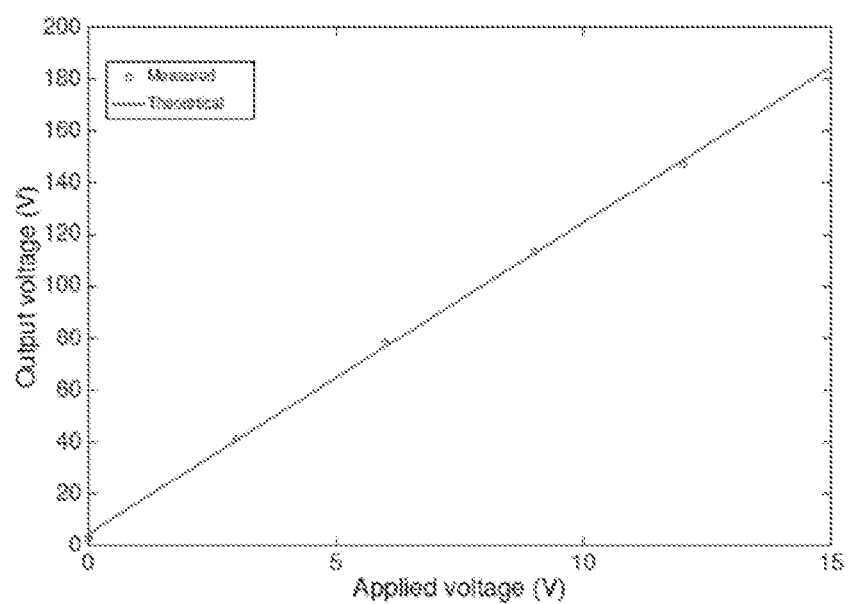
FIG. 9A is a plot of output voltage versus applied voltage using an illustrative ambient energy harvesting apparatus with the movable electrode comprising a 10 µL mercury droplet with CYTOP® amorphous fluoropolymer (commercially available from Asahi Glass Co., Tokyo, Japan) used on both sides.

FIG. 9A is a plot of output voltage versus applied voltage using an ambient energy harvesting apparatus with the movable electrode comprising a 10 μL mercury droplet with CYTOP® amorphous fluoropolymer used on both sides. The same non-polar material was used to fabricate the hydrophobic surfaces. In this case, CYTOP® amorphous fluoropolymer was used with the thin and thick layers to be 200 nm and 3.8 μm, respectively. For a 10 μL mercury droplet, the effective capacitances were 2.367 nF and 0.197 nF, respectively. FIG. 9A shows the relationship between the applied and the output voltages. Under a 12 V power supply, the harvested energy was 1.98 μJ per cycle. Without the source, it was 2.15 nJ. As shown, the measured results match up with the theoretical results.

Figure 9B:
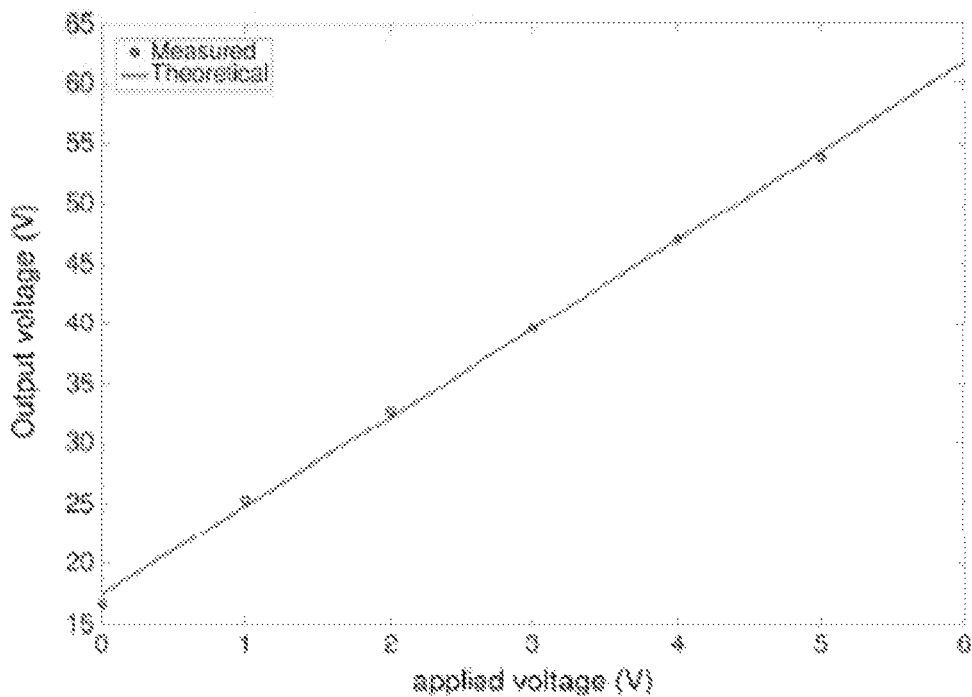
FIG. 9B is a plot of output voltage versus applied voltage using an illustrative ambient energy harvesting apparatus with the movable electrode comprising a 10 µL mercury droplet with CYTOP® amorphous fluoropolymer used one side and PTFE on the other side.

FIG. 9B is a plot of output voltage versus applied voltage using an ambient energy harvesting apparatus with the movable electrode comprising a 10 μL mercury droplet with CYTOP® amorphous fluoropolymer used on one side and PTFE on the other side. In this case, the thin and thick layers were coated with CYTOP® amorphous fluoropolymer (200 nm) and PTFE (2.5 μm), respectively. The effective capacitances for a mercury droplet were 4.072 nF and 0.349 nF, respectively. FIG. 9B shows the experimental results. Under a 5V source, the harvested energy was 0.46 μJ per cycle, while without the source, it was 57.9 nJ. As shown, the measured results match up with the theoretical results.

Figure 9C:
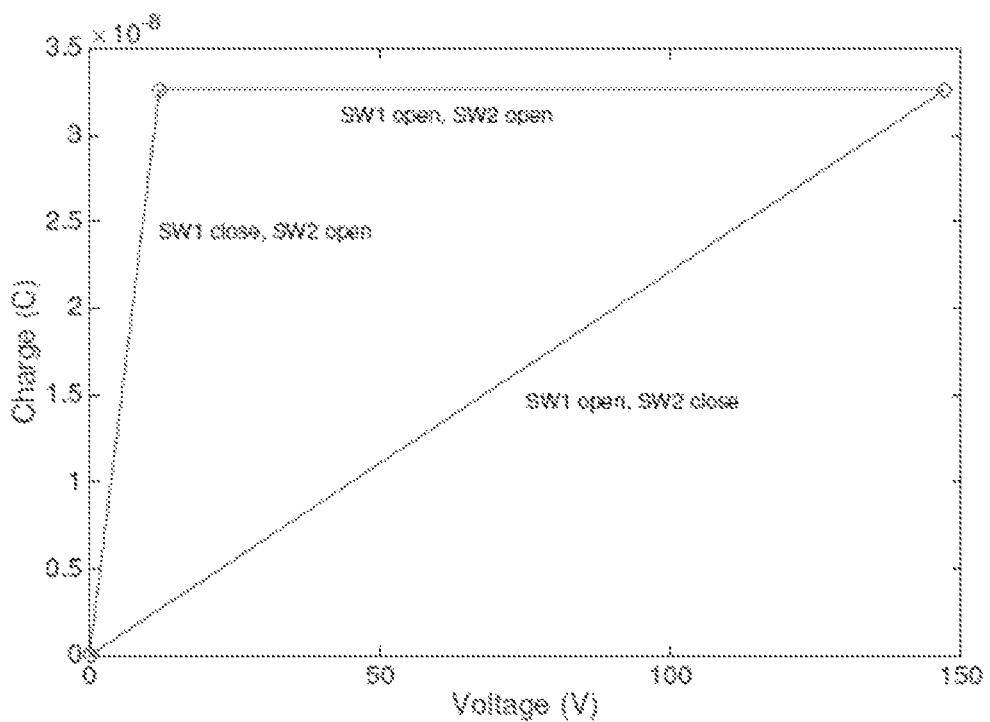
FIG. 9C is a plot of output voltage versus applied voltage using an illustrative ambient energy harvesting apparatus with the movable electrode comprising a 10 µL mercury droplet.

FIG. 9C is a plot of output voltage versus applied voltage using an ambient energy harvesting apparatus with the movable electrode comprising a 10 μL mercury droplet. The thin non-polar layer was 200 nm. The amount of energy harvested per cycle is equal to the area of the triangle, which can be obtained as 2.2 μJ when the applied voltage was 12 V.

Figure 9D:
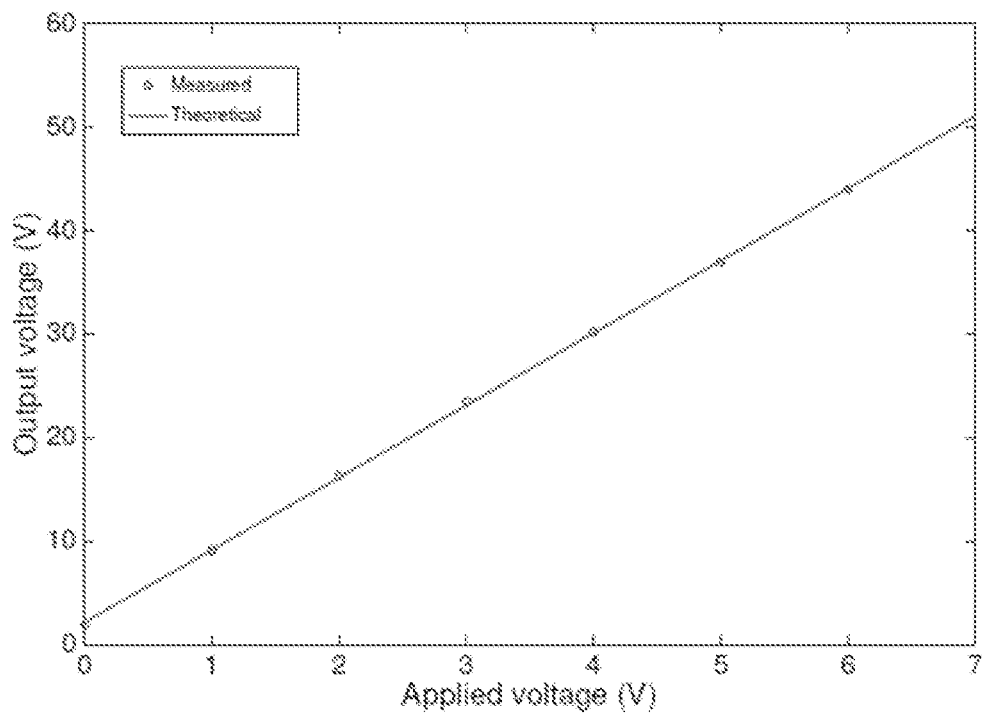
FIG. 9D is a plot of output voltage versus applied voltage using an illustrative ambient energy harvesting apparatus with the movable electrode comprising a 30 µL water droplet.

FIG. 9D is a plot of output voltage versus applied voltage using an ambient energy harvesting apparatus with the movable electrode comprising a 30 μL water droplet. Water drops were used when the same non-polar material was used. In this case, the thin and thick layers of CYTOP® amorphous fluoropolymer coating were 200 nm and 4.0 μm, respectively. With a 30 μL water droplet, the effective capacitances were 3.235 nF and 0.449 nF for the thin and thick side, respectively. Under a 6 V source, the harvested energy was 0.4 μJ per cycle; without the source, it was 1.24 nJ. As shown, the measured results match up with the theoretical results.

Figure 9E:
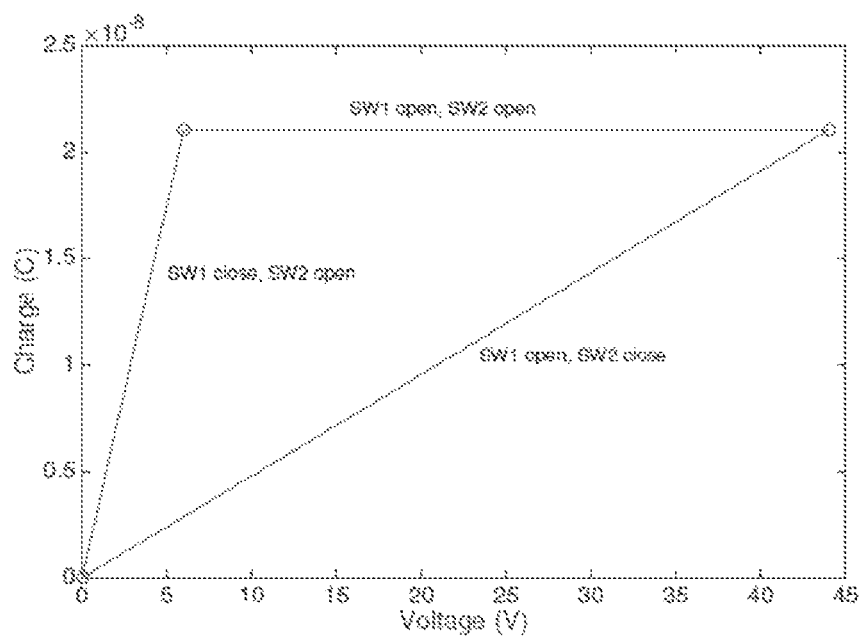
FIG. 9E is a plot of charge versus voltage using an illustrative ambient energy harvesting apparatus with the movable electrode comprising a 30 µL water droplet.

FIG. 9E is a plot of charge versus voltage using an ambient energy harvesting apparatus with the movable electrode comprising a 30 μL water droplet. The thin non-polar layer was 200 nm. The amount of energy harvested per cycle is equal to the area of the triangle, which can be obtained as 0.4 μJ when the applied voltage was 12 V.

Figure 10A:
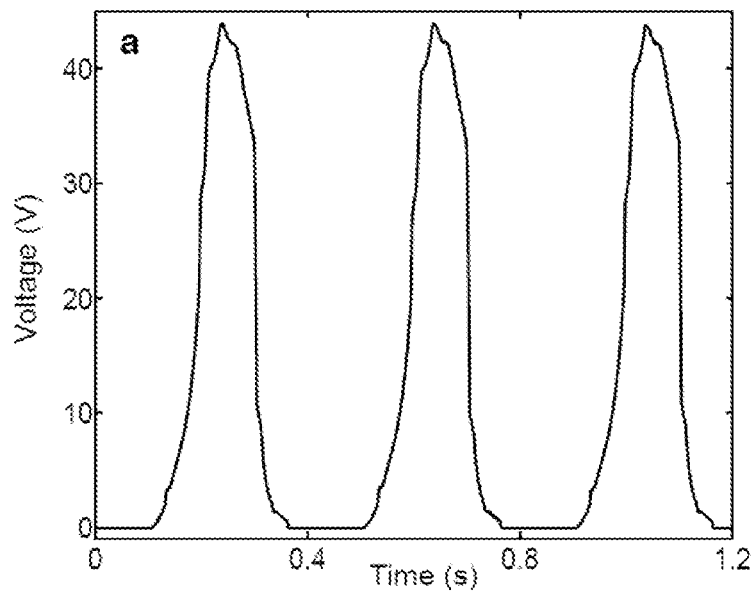
FIG. 10A is a plot of voltage versus time for an illustrative ambient energy harvesting apparatus with a movable electrode without an external bias.
Figure 10B:
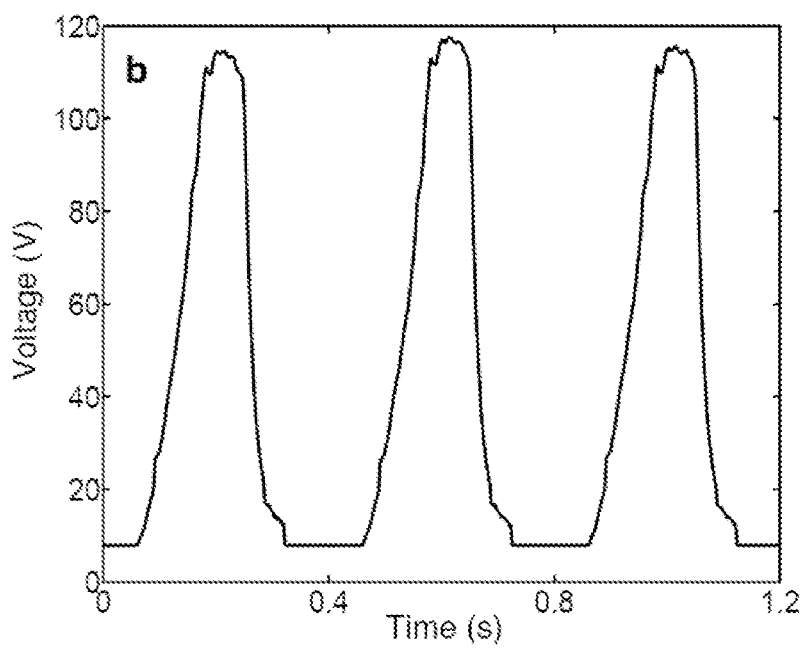
FIG. 10B is a plot of voltage versus time for an illustrative ambient energy harvesting apparatus with a movable electrode with an external bias of 8 V.

FIG. 10A is a plot of voltage versus time with no external bias, and FIG. 10B is a plot of voltage versus time with an external bias of 8 V bias. The open-circuit voltages obtained with this scheme under a 2.5 Hz vibration were measured continuously. In this scenario, because the external bias is applied when the droplet is on PTFE, the measured voltage on the PTFE side is the same as the applied bias. Therefore, the voltages shown in FIGS. 10A and 10B are non-negative. For a 400 μL water droplet, the peak voltage reached 44 V and 115 V for the two cases, respectively. Note that with a more than 10-fold decrease in the thickness of the CYTOP® amorphous fluoropolymer layer, i.e. from 6.6 μm to 0.5 μm, the increase in voltage was less than 5%, i.e. from 42 V shown in FIG. 10B to 44 V. Because such thickness variation does not change the thickness of the double layer at the interface, the resulting slight change in the peak voltage indicates the electrostatic induction in the silicon substrate was negligible in this case.

Figure 10C:
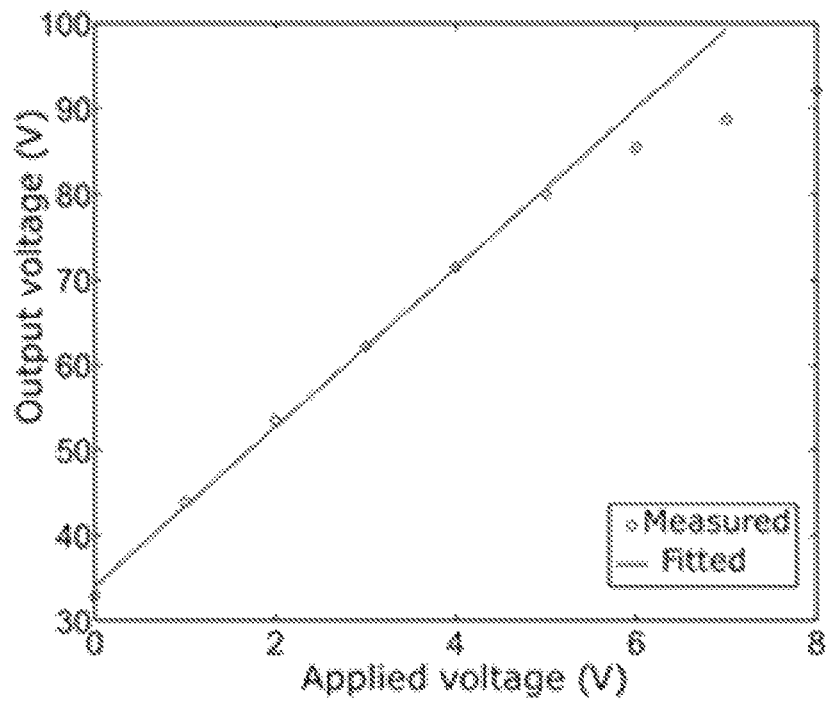
FIG. 10C is a plot of output voltage versus applied voltage using an illustrative ambient energy harvesting apparatus with a movable electrode.
Figure 10D:
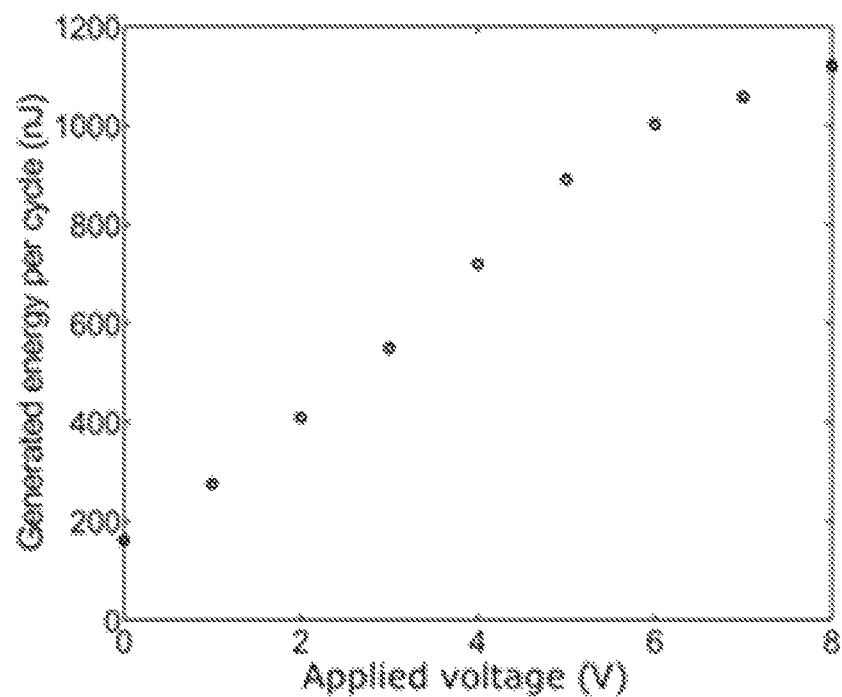
FIG. 10D is a plot of energy harvested per cycle versus applied voltage using an illustrative ambient energy harvesting apparatus with a movable electrode.

FIG. 10C is a plot illustrating output voltage versus applied voltage using an ambient energy harvesting apparatus with a movable electrode, and FIG. 10D is a plot illustrating energy harvested per cycle versus applied voltage using an ambient energy harvesting apparatus with a movable electrode. The effects of the external bias were studied by using different values in experiments and measuring the open-circuit voltages. The water droplet was driven from the PTFE to the CYTOP® amorphous fluoropolymer surface by introducing an 8° inclination. The open-circuit voltages were measured when the droplet was on CYTOP® amorphous fluoropolymer. As shown in FIG. 10C, the open-circuit voltage was proportional to the applied bias. It reached 33 V and 92 V for a zero bias and an 8 V bias, respectively. The peak values presented in FIGS. 10C and 10D are higher because of overshoot resulting from the collisions of the droplet and an acrylic wall. Note that not all charge will move with the droplet if it moves from one material to the other. However, if the droplet is always electrically discharged before it moves to the other material, the leftover charge from the previous cycle will always be discharged, leaving no effect on the harvested energy as shown in FIG. 10D. In this scenario, the droplet was discharged only on CYTOP® amorphous fluoropolymer; thus, the leftover charge on PTFE needed to be included in the calculation of the energy harvested. Experimental results suggest that the leftover charge is linearly proportional to the applied bias. A parasite capacitor, therefore, can be used to model such a behavior. The net energy harvested per cycle, which is the difference between the total raised potential energy and the initial energy input from the bias, can thus be calculated. The results are shown in FIG. 10D. According to the collected data, a higher bias increases the harvested energy. For example, the energy harvested per cycle increased from 0.16 μJ with a zero bias to 1.12 μJ with an 8 V bias.

Figure 11A:
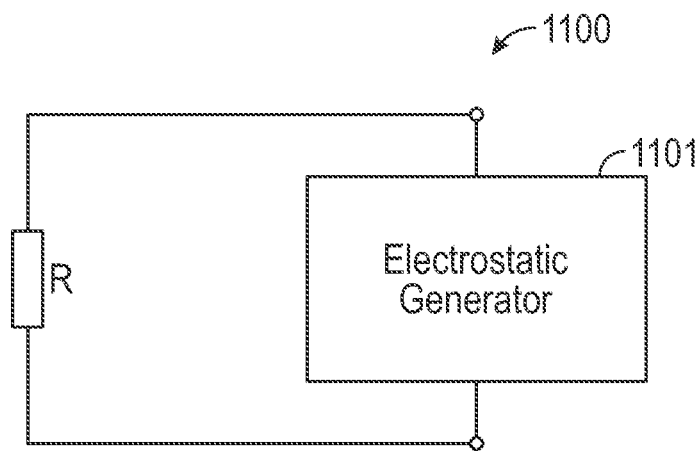
FIG. 11A is a circuit diagram of an illustrative ambient energy harvesting system with continuous conductive paths and without a voltage bias.

FIG. 11A is a circuit diagram of an ambient energy harvesting system 1100 (see FIGS. 11B-11C) with continuous conductive paths and without a voltage bias. The ambient energy harvesting system 1100 includes an electrostatic generator 1101 similar to that discussed above with respect to FIG. 3A. In this mode, switching is not needed. Electrical energy is collected throughout the motion of the movable electrode 102. The operation is carried out in cycles, each with two phases. The apparatus is configured such that the movable electrode 102 closes a first conductive path with the reference electrode 108 when the apparatus 1100 is in a first state with the movable electrode 102 at a first end 106A of the base 104. The movable electrode 102 closes a second conductive path with the reference electrode 108 when the apparatus 1100 is in a second state with the movable electrode 102 at a second end 106B of the base 104. Similarly, the movable electrode 102 closes a third conductive path with the reference electrode 108 when the apparatus 1100 is in an intermediate state between the first state and the second state. In particular, the apparatus 1100 is configured such that a continuous conductive path is provided between the movable electrode 102 and the reference electrode 108 when the apparatus 1100 is operated between the first state and the second state.

Figure 11B:
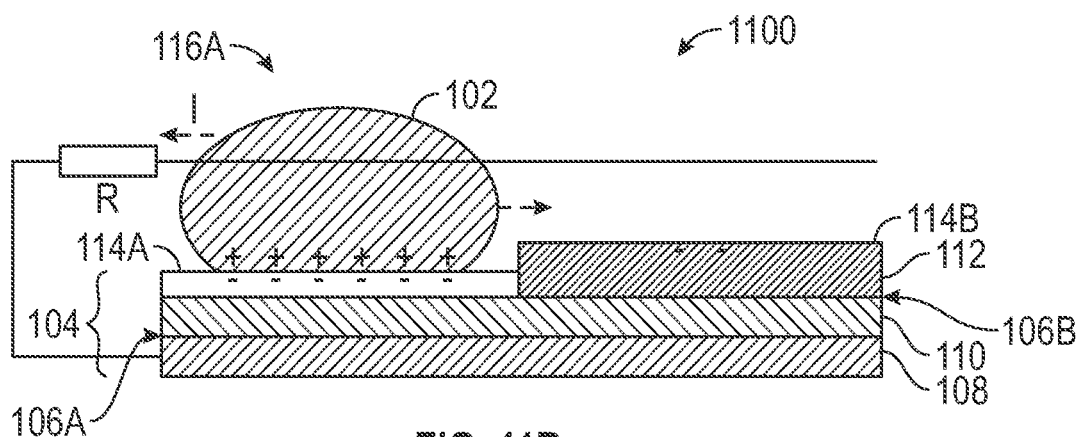
FIG. 11B is a side cross-sectional view of an illustrative ambient energy harvesting system with continuous conductive paths and without a voltage bias, the first dielectric interface region and the second dielectric interface region having differing thicknesses, the apparatus being in a first operational phase with the movable electrode in a first position proximate to the first dielectric interface region.

FIG. 11B is a side cross-sectional view of an ambient energy harvesting system 1100 with continuous conductive paths and without a voltage bias. The first dielectric interface region 114A has a thickness that differs from that of the second dielectric interface region 114B. The apparatus 1100 is in a first operational phase with the movable electrode 102 in a first position proximate to the first dielectric interface region 114A of the top dielectric layer 112 (e.g., the thinner side of the coating). Because of contact electrification, an electrical double layer (DL) is formed with the amount of charges determined by the materials and surface characteristics of the movable electrode 102 and the top dielectric layer 112. When the movable electrode 102 moves onto the first dielectric interface region 114A of the top dielectric layer 112 (e.g., the thicker side of the coating), the capacitance starts to decease. Current flows until the movable electrode 102 is positioned completely on the second dielectric interface region 114B with a stable DL.

Figure 11C:
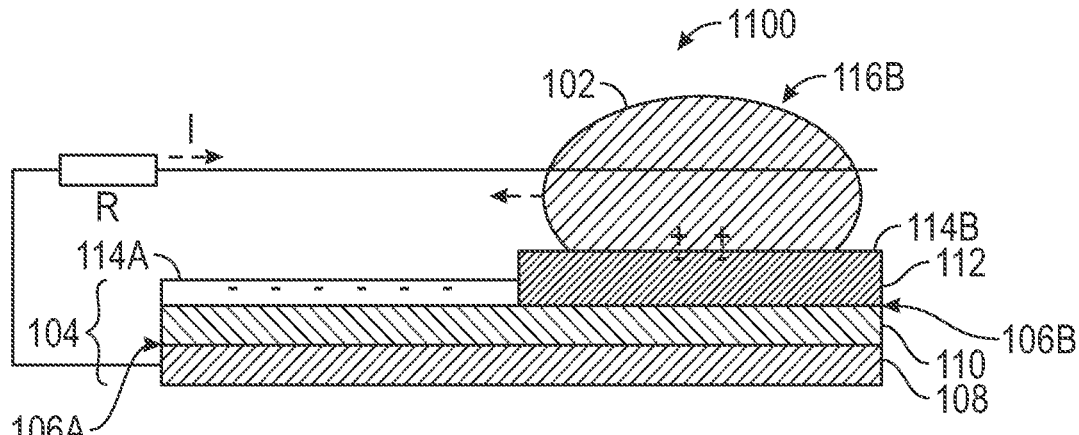
FIG. 11C is a side cross-sectional view of the ambient energy harvesting system of FIG. 11B in a second operational phase with the movable electrode in a second position proximate to the second dielectric interface region.

FIG. 11C is a side cross-sectional view of the ambient energy harvesting system 1100 of FIG. 11B in a second operational phase with the movable electrode 102 in a second position proximate to the second dielectric interface region 114B. The movable electrode 102 moves toward the first dielectric interface region 114A. As the movable electrode 102 touches the first dielectric interface region 114A, the capacitance starts to increase. An electrical DL starts to form on the first dielectric interface region 114A, which induces opposite charges on the movable electrode 102. Current starts to flow in a direction opposite to that in FIG. 11B until the movable electrode 102 is positioned completely on the first dielectric interface region 114A with a stable DL.

Figure 12A:
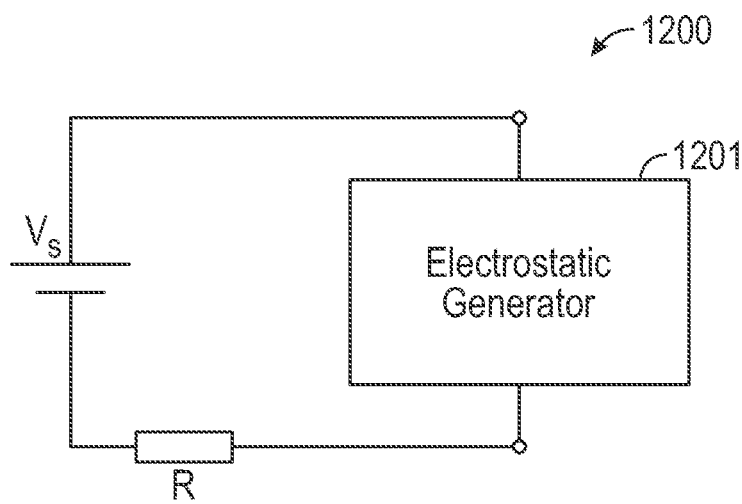
FIG. 12A is a circuit diagram of an illustrative ambient energy harvesting system with a continuous conductive paths and with a voltage bias.

FIG. 12A is a circuit diagram of an ambient energy harvesting system 1200 (see FIGS. 12B-12C) with continuous conductive paths and with a voltage bias. The ambient energy harvesting system 1200 includes an electrostatic generator 1201 similar to that discussed above with respect to FIG. 3A. An external source (e.g., a voltage source) can be used to increase the harvested energy. In operation of the ambient energy harvesting system 1200, the process is generally the same as discussed with respect to FIGS. 11A-11C.

Figure 12B:
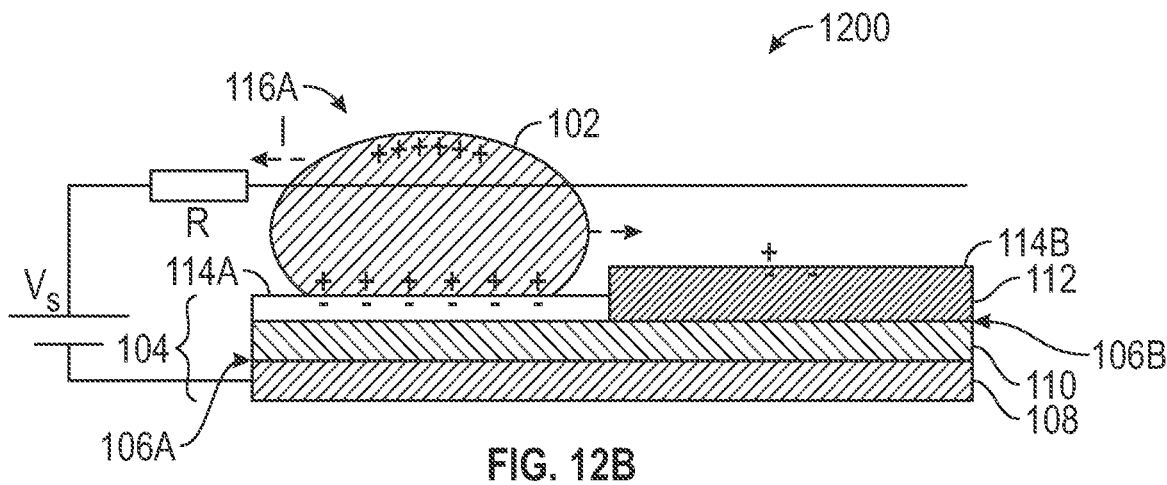
FIG. 12B is a side cross-sectional view of an illustrative ambient energy harvesting system with continuous conductive paths and without a voltage bias, the first dielectric interface region and the second dielectric interface region having differing thicknesses, the apparatus being in a first operational phase with the movable electrode in a first position proximate to the first dielectric interface region.

FIG. 12B is a side cross-sectional view of an ambient energy harvesting system 1200 with continuous conductive paths and without a voltage bias. The first dielectric interface region 114A has a thickness that differs from that of the second dielectric interface region 1148. The apparatus is in a first operational phase with the movable electrode 102 in a first position proximate to the first dielectric interface region 114A.

Figure 12C:
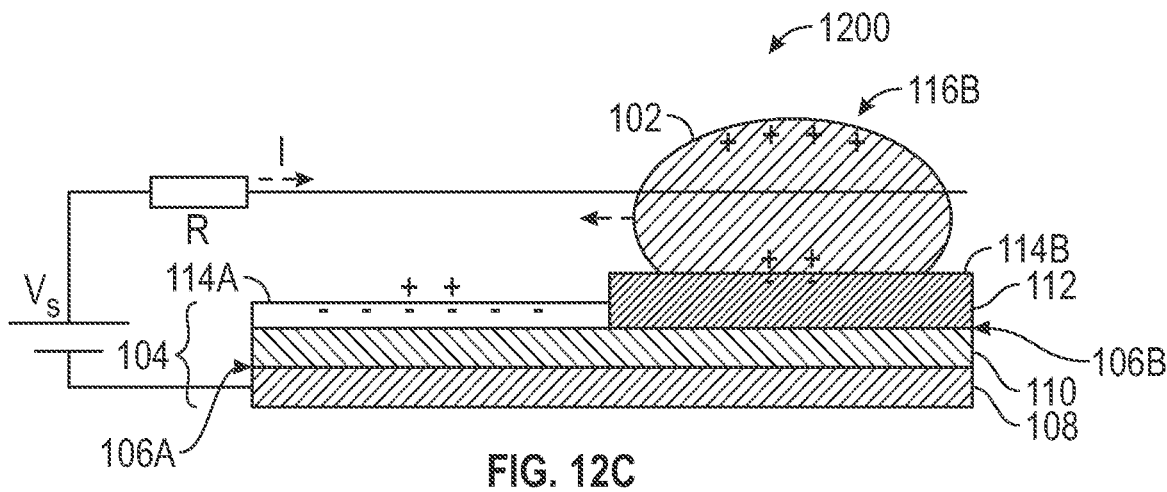
FIG. 12C is a side cross-sectional view of the ambient energy harvesting system of FIG. 12B in a second operational phase with the movable electrode in a second position proximate to the second dielectric interface region.

FIG. 12C is a side cross-sectional view of the ambient energy harvesting system 1200 of FIG. 12B in a second operational phase with the movable electrode 102 in a second position proximate to the second dielectric interface region 114B.

Figure 13:
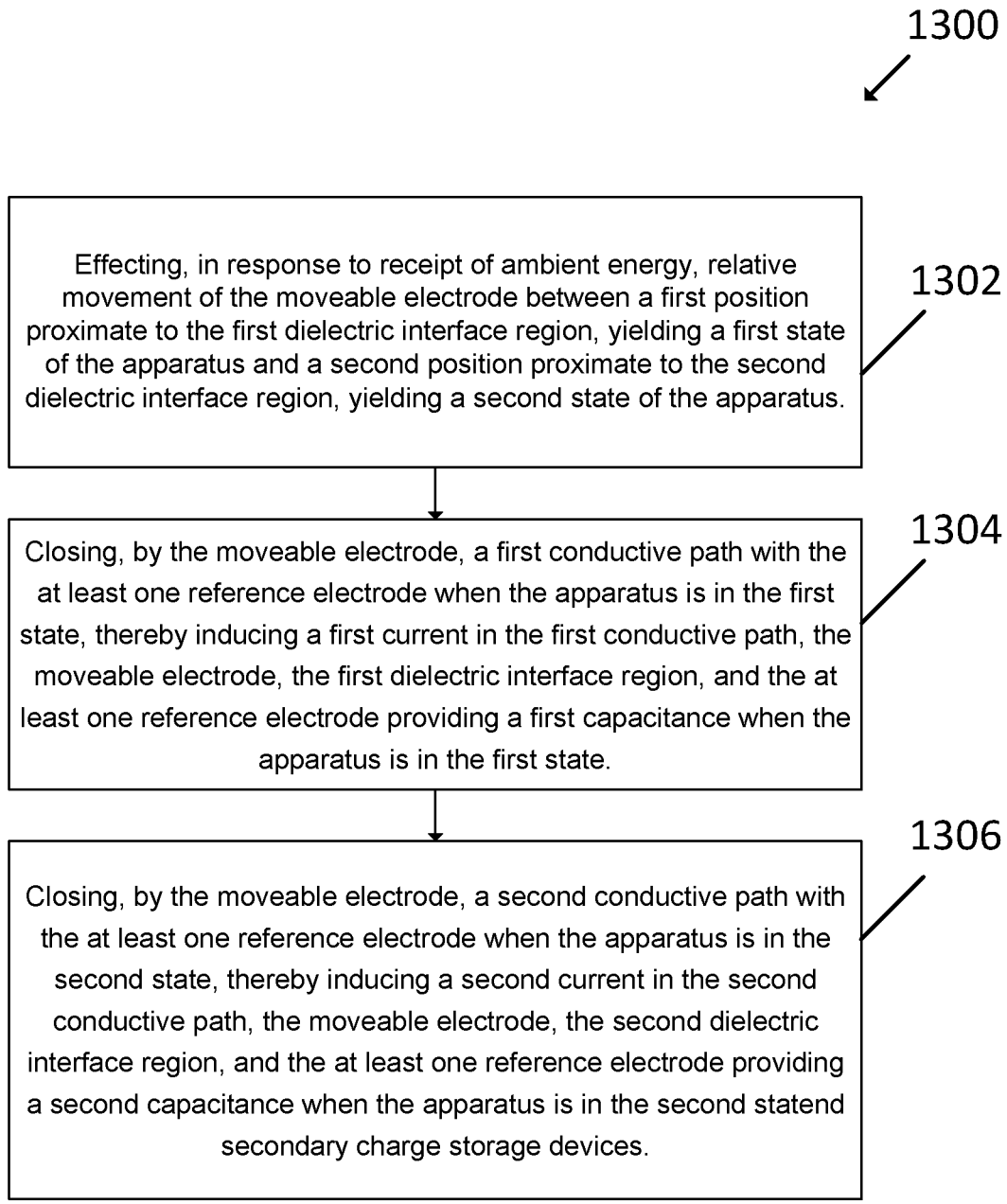
FIG. 13 is a flowchart outlining steps of an illustrative method for harvesting ambient energy using a movable electrode according to certain embodiments.

FIG. 13 is a flowchart outlining steps 1302-1306 of a method 1300 for harvesting ambient energy using a movable electrode according to certain embodiments. The method for harvesting ambient energy utilizes an apparatus comprising an electrically conductive charge-carrying movable electrode, a first dielectric interface region having a first surface charge density, a second dielectric interface region having a second surface charge density, and at least one reference electrode. Step 1302 includes effecting, in response to receipt of ambient energy, relative movement of the movable electrode between a first position proximate to the first dielectric interface region, yielding a first state of the apparatus and a second position proximate to the second dielectric interface region, yielding a second state of the apparatus. Step 1304 includes closing, by the movable electrode, a first conductive path with the at least one reference electrode when the apparatus is in the first state, thereby inducing a first current in the first conductive path, the movable electrode, the first dielectric interface region, and the at least one reference electrode providing a first capacitance when the apparatus is in the first state. Step 1306 includes closing, by the movable electrode, a second conductive path with the at least one reference electrode when the apparatus is in the second state, thereby inducing a second current in the second conductive path, the movable electrode, the second dielectric interface region, and the at least one reference electrode providing a second capacitance when the apparatus is in the second state. An amplitude of the second current is dependent on (a) a difference between the first capacitance and the second capacitance, and/or (b) a difference between the first surface charge density and the second surface charge density.

Those skilled in the art will recognize improvements and modifications to the preferred embodiments of the present disclosure. All such improvements and modifications are considered within the scope of the concepts disclosed herein and the claims that follow.

What is claimed is:

1. An apparatus for harvesting ambient energy, the apparatus comprising:
   an electrically conductive charge-carrying movable electrode;
   a first dielectric interface region having a first surface charge density;
   a second dielectric interface region having a second surface charge density; and
   at least one reference electrode;
   wherein the apparatus is configured for relative movement of the movable electrode in response to receipt of ambient energy between (i) a first position proximate to the first dielectric interface region, yielding a first state of the apparatus and (ii) a second position in which the movable electrode is proximate to the second dielectric interface region, yielding a second state of the apparatus;
   wherein when the apparatus is in the first state, the movable electrode, the first dielectric interface region, and the at least one reference electrode provide a first capacitance, and when the apparatus is in the second state, the movable electrode, the second dielectric interface region, and the at least one reference electrode provide a second capacitance;
   wherein the apparatus is configured such that the movable electrode closes a first conductive path with the at least one reference electrode when the apparatus is in the first state, and the movable electrode closes a second conductive path with the at least one reference electrode when the apparatus is in the second state; and
   wherein the apparatus comprises at least one of the following features (a) or (b): (a) the first capacitance differs from the second capacitance, or (b) the first surface charge density differs from the second surface charge density.

2. The apparatus of claim 1, wherein the first capacitance differs from the second capacitance.

3. The apparatus of claim 2, wherein the apparatus further comprises an electrical charge source in the first conductive path.

4. The apparatus of claim 1, wherein the first surface charge density differs from the second surface charge density.

5. The apparatus of claim 4, wherein the first surface charge density differs from the second surface charge density, and the apparatus further comprises an electrical charge source in the first conductive path.

6. The apparatus of claim 1, wherein the first capacitance differs from the second capacitance, and the first surface charge density differs from the second surface charge density.

7. The apparatus of claim 6, wherein the apparatus further comprises an electrical charge source in the first conductive path.

8. The apparatus of claim 1, wherein the movable electrode comprises a liquid droplet.

9. The apparatus of claim 8, wherein the liquid droplet comprises water or mercury.

10. The apparatus of claim 1, wherein the first dielectric interface region comprises a different thickness than the second dielectric interface region.

11. The apparatus of claim 1, wherein the first dielectric interface region is compositionally different from the second dielectric interface region.

12. The apparatus of claim 1, wherein the apparatus is configured such that the movable electrode closes a third conductive path with the at least one reference electrode when the apparatus is in an intermediate state between the first state and the second state.

13. The apparatus of claim 12, wherein the apparatus further comprises an electrical charge source in the first conductive path.

14. The apparatus of claim 1, wherein the apparatus is configured such that a continuous conductive path is provided between the movable electrode and the at least one reference electrode when the apparatus is operated between the first state and the second state.

15. The apparatus of claim 1, wherein the at least one reference electrode comprises a common reference electrode.

16. The apparatus of claim 1, wherein the at least one reference electrode comprises a first reference electrode associated with the first dielectric interface region, and a second reference electrode associated with the second dielectric interface region.

17. The apparatus of claim 1, wherein:
the first dielectric interface region is arranged between the movable electrode and the at least one reference electrode; and
the second dielectric interface region is arranged between the movable electrode and the at least one reference electrode.

18. A method for harvesting ambient energy utilizing an apparatus comprising an electrically conductive charge-carrying movable electrode, a first dielectric interface region having a first surface charge density, a second dielectric interface region having a second surface charge density, and at least one reference electrode, the method comprising:

effecting, in response to receipt of ambient energy, relative movement of the movable electrode between a first position proximate to the first dielectric interface region, yielding a first state of the apparatus and a second position proximate to the second dielectric interface region, yielding a second state of the apparatus;

closing, by the movable electrode, a first conductive path with the at least one reference electrode when the apparatus is in the first state, thereby inducing a first current in the first conductive path, the movable electrode, the first dielectric interface region, and the at least one reference electrode providing a first capacitance when the apparatus is in the first state; and closing, by the movable electrode, a second conductive path with the at least one reference electrode when the apparatus is in the second state, thereby inducing a second current in the second conductive path, the movable electrode, the second dielectric interface region, and the at least one reference electrode providing a second capacitance when the apparatus is in the second state, an amplitude of the second current dependent on at least one of the following features (a) or (b): (a) a difference between the first capacitance and the second capacitance, or (b) a difference between the first surface charge density and the second surface charge density.

19. The method of claim 18, wherein the amplitude of the second current is dependent on a difference between the first capacitance and the second capacitance.

20. The method of claim 18, wherein the amplitude of the second current is dependent on a difference between the first surface charge density and the second surface charge density.

21. The method of claim 18, wherein the amplitude of the second current is dependent on both (i) a difference between the first capacitance and the second capacitance, and (ii) a difference between the first surface charge density and the second surface charge density.

* * * * *